United States Patent
Tsuchida et al.

(10) Patent No.: US 10,914,932 B2
(45) Date of Patent: Feb. 9, 2021

(54) MICROSCOPE WITH OBSERVATION OPTICAL SYSTEM INCLUDING OPTICAL FILTER, LIGHT DISPERSING ELEMENT, AND LIGHT BLOCK PLATE

(71) Applicant: NIKON CORPORATION, Tokyo (JP)

(72) Inventors: Shota Tsuchida, Tokyo (JP); Kei Horie, Fujisawa (JP)

(73) Assignee: NIKON CORPORATION, Tokyo (JP)

( * ) Notice: Subject to any disclaimer, the term of this patent is extended or adjusted under 35 U.S.C. 154(b) by 200 days.

(21) Appl. No.: 16/193,214

(22) Filed: Nov. 16, 2018

(65) Prior Publication Data

US 2019/0101738 A1    Apr. 4, 2019

Related U.S. Application Data

(63) Continuation of application No. PCT/JP2016/064932, filed on May 19, 2016.

(51) Int. Cl.
*G02B 21/06* (2006.01)
*G02B 21/16* (2006.01)
(Continued)

(52) U.S. Cl.
CPC .............. *G02B 21/16* (2013.01); *G01N 21/64* (2013.01); *G02B 21/0064* (2013.01);
(Continued)

(58) Field of Classification Search
CPC ................ G02B 21/16; G02B 21/0064; G02B 21/0076; G02B 21/06; G02B 21/361;
(Continued)

(56) References Cited

U.S. PATENT DOCUMENTS 5,852,498 A * 12/1998 Youvan ............... G01J 3/12
356/417
5,863,504 A * 1/1999 Heffelfinger ........... G01N 21/64
422/50

(Continued)

FOREIGN PATENT DOCUMENTS

| CN | 101836152 A | 9/2010 |
| CN | 102004307 A | 4/2011 |
| CN | 102288588 A | 12/2011 |
| CN | 102998789 A | 3/2013 |
| JP | 2000-056228 A | 2/2000 |
| JP | 2006-010944 A | 1/2006 |

(Continued)

OTHER PUBLICATIONS

Aug. 23, 2016 International Search Report issued in Patent Application No. PCT/JP2016/064932.
Jul. 2, 2019 Japanese Office Action issued in Japanese Patent Application No. 2018-518027.
(Continued)

*Primary Examiner* — Arnel C Lavarias
(74) *Attorney, Agent, or Firm* — Oliff PLC

(57) ABSTRACT

It is aimed to prevent excitation light from leaking and being detected by the detector in a fluorescence microscope. A microscope includes an illumination optical system configured to illuminate a specimen with excitation light, a detector configured to detect fluorescence emitted from the specimen, and an observation optical system configured to guide the fluorescence to the detector. The observation optical system includes an optical filter having a variable wavelength characteristic, a light dispersing element configured to disperse, into light beams, light that has passed through the optical filter, and a light block plate configured to block at least some of the light beams resulting from the dispersion by the light dispersing element.

11 Claims, 23 Drawing Sheets

(51) Int. Cl.
    *G02B 21/00* (2006.01)
    *G02B 26/00* (2006.01)
    *G01N 21/64* (2006.01)
    *G02B 21/36* (2006.01)
    *G02B 26/10* (2006.01)

(52) U.S. Cl.
    CPC ......... *G02B 21/0076* (2013.01); *G02B 21/06* (2013.01); *G02B 21/361* (2013.01); *G02B 21/368* (2013.01); *G02B 26/007* (2013.01); *G01N 21/6458* (2013.01); *G01N 2021/6471* (2013.01); *G02B 26/105* (2013.01)

(58) Field of Classification Search
    CPC .. G02B 21/368; G02B 26/007; G02B 26/105; G02B 21/00; G02B 21/0004; G02B 21/002; G01N 21/64; G01N 21/6458; G01N 2021/6471; G01N 21/6428; G01N 2021/6439; G01N 2021/6441; G01N 2021/6463; G01N 21/6486
    USPC ....... 359/385, 362, 363, 368, 369, 381, 388, 359/389, 390; 356/402, 416, 417
    See application file for complete search history.

(56) References Cited

U.S. PATENT DOCUMENTS

| | | | | |
|---|---|---|---|---|
| 7,319,520 | B2 * | 1/2008 | Olschewski | G01N 21/6428 |
| | | | | 356/317 |
| 7,411,673 | B2 * | 8/2008 | Gould | G01J 3/02 |
| | | | | 250/458.1 |
| 8,189,191 | B2 * | 5/2012 | Webb | G01J 3/0237 |
| | | | | 356/326 |
| 2003/0095329 | A1 | 5/2003 | Engelhardt | |
| 2005/0286048 | A1 | 12/2005 | Kitagawa | |

FOREIGN PATENT DOCUMENTS

| | | |
|---|---|---|
| JP | 2008-299207 A | 12/2008 |
| JP | 2009-294392 A | 12/2009 |
| JP | 2011-186182 A | 9/2011 |
| JP | 2012-03198 A | 1/2012 |

OTHER PUBLICATIONS

Jun. 23, 2020 Office Action issued in Chinese Patent Application No. 201680085891.2.
Nov. 20, 2018 International Preliminary Report on Patentability issued in International Patent Application No. PCT/JP2016/064932.

* cited by examiner

MICROSCOPE WITH OBSERVATION OPTICAL SYSTEM INCLUDING OPTICAL FILTER, LIGHT DISPERSING ELEMENT, AND LIGHT BLOCK PLATE

The contents of the following International patent application are incorporated herein by reference:
NO. PCT/JP2016/064932 filed on May 19, 2016.

BACKGROUND

1. Technical Field

The present invention relates to a microscope.

2. Related Art

A known fluorescence microscope includes a band pass filter having adjustable wavelength characteristics (see, for example, Japanese Patent Application Publication No. 2000-056228).

The above-mentioned band pass filter having adjustable wavelength characteristics, however, has disadvantages of poor light blocking capability.

SUMMARY

A first aspect of the present invention provides a microscope including an illumination optical system configured to illuminate a specimen with excitation light, a detector configured to detect fluorescence emitted from the specimen, and an observation optical system configured to guide the fluorescence to the detector. The observation optical system includes an optical filter having a variable wavelength characteristic, a light dispersing element configured to disperse, into light beams, light that has passed through the optical filter, and a light block plate configured to block at least some of the light beams resulting from the dispersion by the light dispersing element.

A second aspect of the present invention provides a microscope including an illumination optical system configured to illuminate a specimen with excitation light, a detector configured to detect fluorescence emitted from the specimen, and an observation optical system configured to guide the fluorescence to the detector. The observation optical system includes an optical filter having a variable wavelength characteristic, where the optical filter is configured to block a longer wavelength band of incoming light, a light dispersing element configured to disperse, into light beams, light that has passed through the optical filter, and a light block plate configured to block a shorter wavelength band of the light beams resulting from the dispersion by the light dispersing element.

A third aspect of the present invention provides a microscope including an illumination optical system configured to illuminate a specimen with excitation light, a detector configured to detect fluorescence emitted from the specimen, and an observation optical system configured to guide the fluorescence to the detector. The observation optical system includes an optical filter having a variable wavelength characteristic, where the optical filter is configured to block a shorter wavelength band of incoming light, a light dispersing element configured to disperse, into light beams, light that has passed through the optical filter, and a light block plate configured to block a longer wavelength band of the light beams resulting from the dispersion by the light dispersing element.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
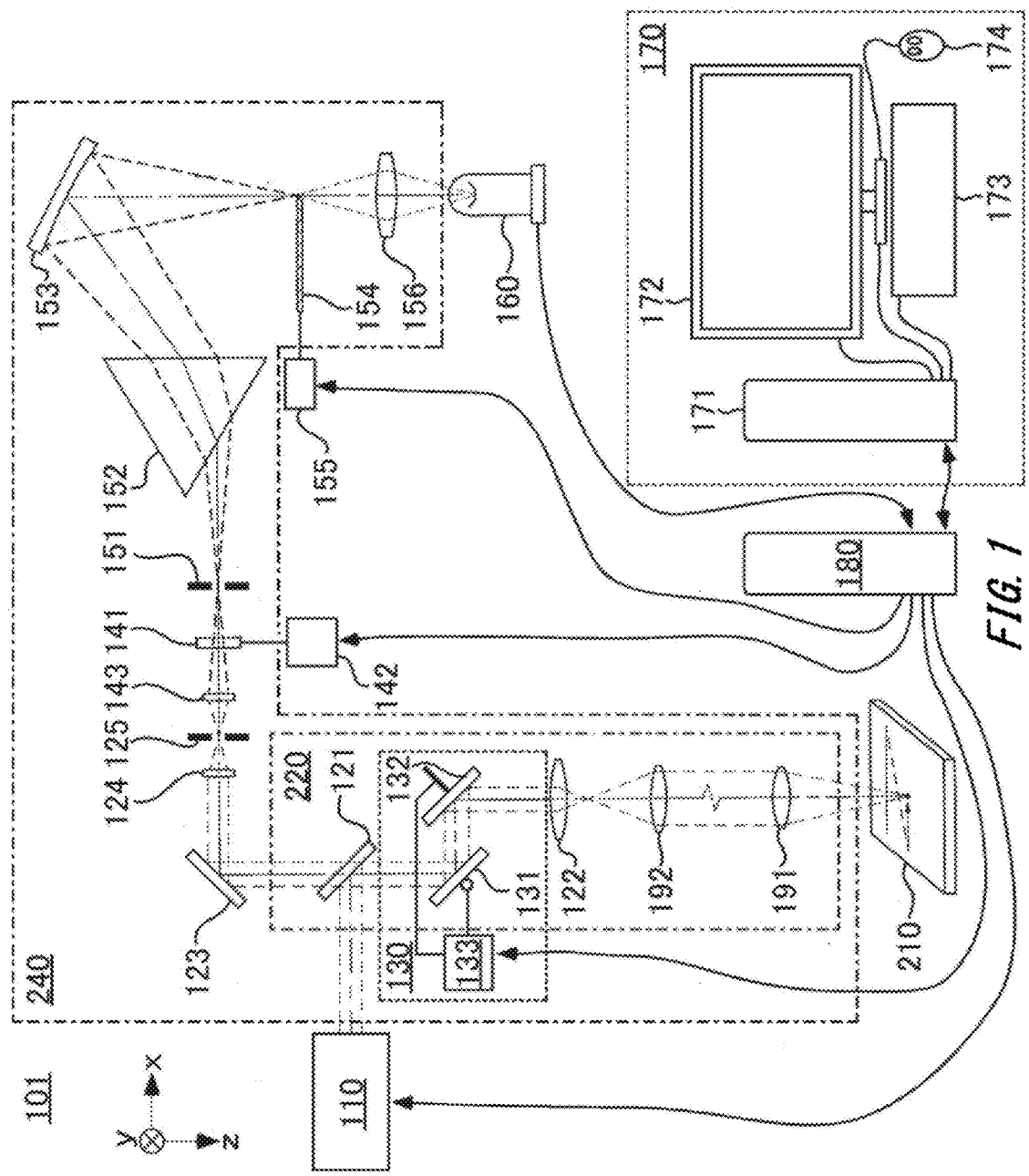
FIG. 1 schematically shows a microscope 101.

FIG. 1 schematically shows the structure of a microscope 101 used to observe a specimen 210. The microscope 101 is a confocal microscope and includes a light source 110, an illumination optical system 220, an observation optical system 240, a detector 160, an information processing apparatus 170 and a control apparatus 180.

The illumination optical system 220 and the observation optical system 240 share some of the optical elements. Note that the microscope 101 does not necessarily include all of these constituents. For example, the light source 110, information processing apparatus 170, or control apparatus 180 may be omitted.

The light source 110 is configured to emit laser light of a particular wavelength that can be used as the excitation light to observe the specimen 210 using fluorescence. The excitation light emitted from the light source 110 enters the illumination optical system 220.

The illumination optical system 220 includes a dichroic mirror 121, a galvano scanner 130, a relay lens 122, a lens 192 and an objective lens 191. The dichroic mirror 121 has such characteristics that it reflects the wavelength of the excitation light emitted from the light source 110 and transmits the other wavelengths. The excitation light emitted from the light source 110 is reflected by the dichroic mirror 121, so that the propagation direction of the excitation light is changed. As a result, the excitation light enters the galvano scanner 130.

The galvano scanner 130 includes a pair of galvano mirrors 131 and 132 configured to reflect the incoming light. The galvano mirror 131 is rotatable around the x axis shown in FIG. 1 and the galvano mirror 132 is rotatable around the y axis. After entering the galvano scanner 130, the excitation light is reflected by the pair of galvano mirrors 131 and 132 and subsequently enters the objective lens 191 after travelling through the relay lens 122 and the lens 192.

After leaving the relay lens 122, the excitation light is turned into parallel light beams by the lens 192 and subsequently converged by the objective lens 191 onto the specimen 210.

The orientations of the galvano mirrors 131 and 132 in the galvano scanner 130 are controlled to move the light converged position of the excitation light on the specimen 210. In this manner, the galvano scanner 130 scans the specimen 210 by moving the excitation light in a two-dimensional manner (in the x and y directions in FIG. 1).

The specimen 210 contains, for example, a fluorescent material. In this case, fluorescence is emitted from the light converged position on the specimen 210. It should be noted that the light emitted from the specimen 210, which may be referred to as the emitted light hereinafter, also contains components other than the fluorescence, such as the reflection of the excitation light.

The emitted light from the specimen 210 passes through the objective lens 191 and the lens 192 and then enters the relay lens 122. The focus position of the lens 192 is optically conjugate with the light converged position of the excitation light on the specimen 210. After entering the relay lens 122, the emitted light passes through the galvano scanner 130 and then enters the dichroic mirror 121.

The components of the emitted light that have the same wavelength as the excitation light are reflected by the dichroic mirror 121 so as to travel toward the light source 110. The components of the emitted light that have different wavelengths than the excitation light pass through the dichroic mirror 121.

Note that the dichroic mirror 121 can not completely filter out the components that have the same wavelength as the excitation light. Therefore, the emitted light that has passed through the dichroic mirror 121 still contains the components that have the same wavelength as the excitation light.

The observation optical system 240 shares, with the illumination optical system 220, the above-described dichroic mirror 121, galvano scanner 130, relay lens 122, lens 192 and objective lens 191. The observation optical system 240 additionally includes a reflective mirror 123, a condenser lens 124, a first pinhole 125, a condenser lens 143, a linear variable filter (LVF) 141, a second pinhole 151, a light dispersing element 152, a concave mirror 153, a light block plate 154, and a condenser lens 156.

After having passed through the dichroic mirror 121 and been reflected by the mirror 123, the emitted light passes through the condenser lens 124 and subsequently enters the first pinhole 125. Here, the first pinhole 125 is positioned to be conjugate with the focus position of the objective lens 191. Accordingly, the first pinhole 125 only transmits the light emitted from the light converged position, which is the focus position of the objective lens 191, and blocks the light from the other points as noise.

The condenser lens 143 directs the light that has passed through the first pinhole 125 to a partial region of the LVF 141. The LVF 141 is an optical filter having variable wavelength characteristics. The LVF 141 blocks a partial wavelength band of the incoming light and transmits the remaining wavelength band.

Figure 2:
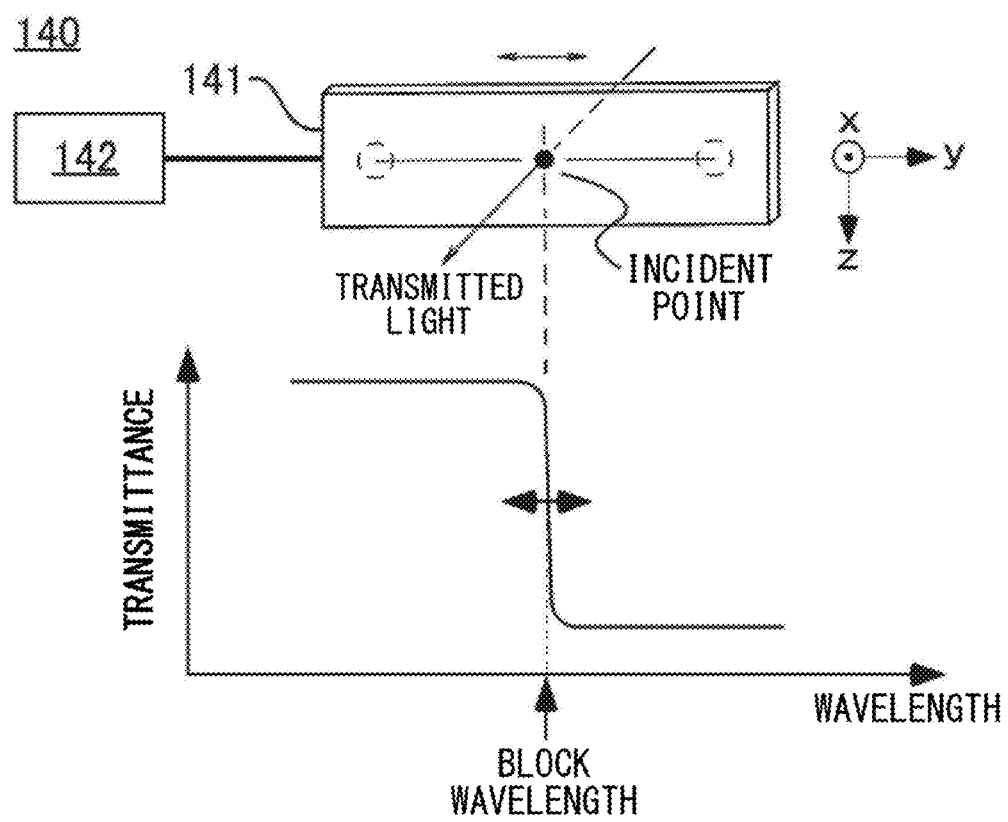
FIG. 2 schematically shows the capability of a LVF 141.

FIG. 2 schematically shows the capability of the LVF 141. The LVF 141 is constituted by a transparent substrate and a dielectric layer that is formed thereon and the thickness of which varies in a predetermined direction (the y direction in FIG. 2), and exhibits different wavelength characteristics depending on which part of the LVF 141 transmits light. To be more specific, when the term "block wavelength" is defined as the boundary between the transmitted wavelengths and the blocked wavelengths, the block wavelength of the LVF 141 varies depending on which portion of the LVF 141 in the y direction transmits the light. Accordingly, when the driver 142 moves the LVF 141 in the y direction, the wavelength characteristics of the LVF 141 for the incoming light, which travels along the fixed optical path, are varied.

The graph shown in the lower portion of FIG. 2 shows the wavelength characteristics of the LVF 141. In the graph shown in FIG. 2, the horizontal and vertical axes respectively represent the wavelength and transmittance. Having the wavelength characteristics shown in FIG. 2, the LVF 141 is a short pass filter configured to transmit light having shorter wavelengths than the block wavelength and blocks light having longer wavelengths than the block wavelength. Alternatively, the LVF 141 may be a long pass filter configured to block light having shorter wavelengths than the block wavelength and transmit light having longer wavelengths than the block wavelength.

With reference to FIG. 1 again, after leaving the LVF 141, the emitted light enters the second pinhole 151. The second pinhole 151 is positioned to be conjugate with the first pinhole 125. The LVF 141 may generate scattered light due to the back surface reflection and the like, but the scattered light can be prevented from entering the optical elements of the following stage since the emitted light is controlled to pass through the second pinhole 151 after leaving the LVF 141.

After having passed through the second pinhole 151, the emitted light enters the light dispersing element 152. The light dispersing element 152 is, for example, a prism. The light dispersing element 152 is configured to spatially disperse the emitted light that has passed through the LVF 141 into multiple light beams corresponding to the different wavelengths. The light beams produced by the light dispersing element 152 are reflected by the concave mirror 153 so that the directions of their optical paths are changed. After this, the light beams pass through the condenser lens 156 and then enter the detector 160.

Between the concave mirror 153 and the condenser lens 156, the light block plate 154 and a driver 155 are provided. The light block plate 154 is configured to be driven by the driver 155 and physically block part of the light beams produced by the light dispersing element 152.

Figure 3:
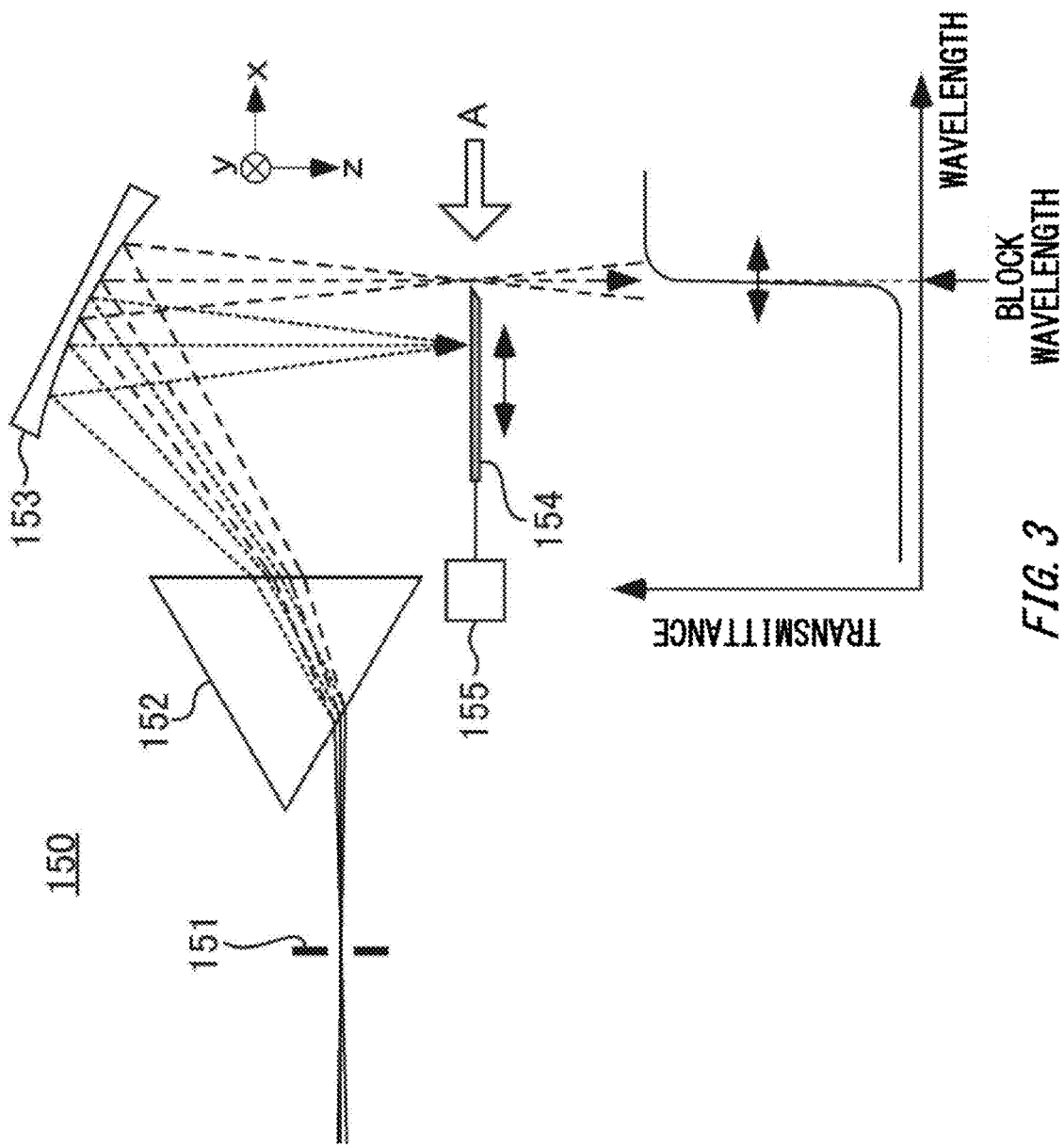
FIG. 3 schematically shows the capability of a light dispersing element 152.

FIG. 3 schematically shows the capability of the light dispersing element 152. As shown in FIG. 3, the light entering into the light dispersing element 152 is dispersed into multiple light beams corresponding to the different wavelengths. For example, when the light dispersing element 152 is a prism, the light entering the prism is dispersed into multiple light beams in such a manner that the respective wavelengths are refracted at different angles determined by their respective refractive indices and exit at different angles.

Furthermore, the light beams produced by the light dispersing element 152 are converged by the concave mirror 153, and part of the converged light beams are blocked by the light block plate 154.

The light block plate 154 is arranged to be capable of moving into or away from the optical paths of the light beams produced by the light dispersing element 152 and block part of the light beams converged by the concave mirror 153. The driver 155 drives the light block plate 154 in the x direction, in which the light beams resulting from the dispersion are arranged next to each other, to vary the wavelengths to be blocked. In other words, when driven by the driver 155, the light block plate 154 is capable of moving into or away from the optical paths of the light beams produced by the light dispersing element 152 from the short wavelength side. Accordingly, the block wavelength is determined by where the edge of the light block plate 154 is positioned, and some of the light beams resulting from the dispersion that have wavelengths shorter than the block wavelength are blocked. In this manner, the light block plate 154 serves as a long pass filter having a variable block wavelength. FIG. 3 shows that the light block plate 154 blocks one of the illustrative two wavelength components that have shorter wavelengths and does not block the one having longer wavelengths. Here, the light block plate 154 may be alternatively inserted into the optical paths of the light beams produced by the light dispersing element 152 from the long wavelength side. In this case, the light block plate 154 is capable of blocking the wavelengths longer than the block wavelength. Therefore, the light block plate 154 serves as a short pass filter having a variable block wavelength.

As described above, the light block plate 154 is configured to physically block the unnecessary wavelength band. As a result, better light blocking capability can be easily attained than when interference filters are used. Furthermore, since the light block plate 154 is configured to block the light beams converged by the concave mirror 153, the light block plate 154 can achieve further improved light blocking characteristics.

Figure 4:
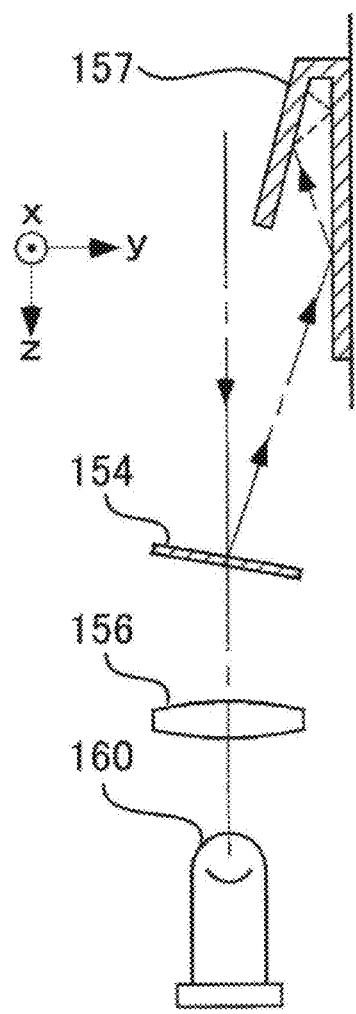
FIG. 4 schematically shows how a light block plate 154 is arranged.

FIG. 4 shows the light block plate 154 when seen from the direction A, which is indicated by the arrow in FIG. 3. FIG. 4 also shows an additionally provided light-absorbing portion 157.

As shown in FIG. 4, the light block plate 154 is tilted in the y direction with respect to the plane orthogonal to the incoming light (the z direction). It should be noted that the light block plate 154 is not tilted in the direction in which the light block plate 154 is moved into or away from the light beams resulting from the dispersion (the x direction).

When blocked by the above-described tilted light block plate 154, the light travels off the optical path directed back to the concave mirror 153 and toward the light-absorbing portion 157. In this manner, the reflected light from the light block plate 154 is absorbed by the light-absorbing portion 157 and prevented from turning into stray light in the microscope 101.

The light-absorbing portion 157 is formed by the inner surfaces of a pair of wall surfaces the gap between which decreases toward the back, that is, that define a wedge-shaped space therebetween, and the inner surfaces are coated with a coating material of low reflectance. In this way, after entering the light-absorbing portion 157, the light is repeatedly reflected within the light-absorbing portion 157 to be eventually attenuated and can be prevented from turning into stray light outside the stray light.

Figure 5:
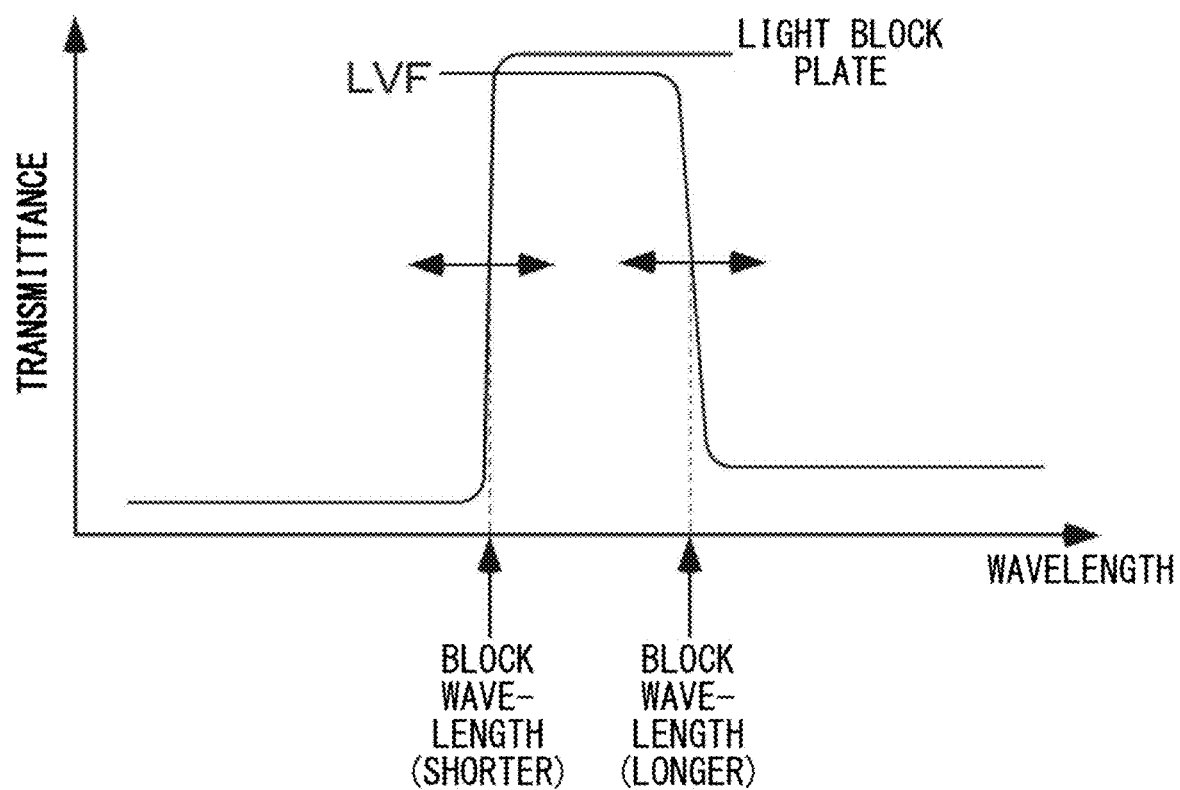
FIG. 5 shows the passband of the microscope 101.

FIG. 5 is a graph showing the characteristics achieved by combining the wavelength characteristics of the LVF 141 and the wavelength characteristics of the light block plate 154. As has been described above, the LVF 141 blocks the longer wavelength components of the incoming light. On the other hand, the light block plate 154 blocks the shorter wavelength components of the incoming light. Accordingly, the combination of the LVF 141 and the light block plate 154 produces a band pass filter that is configured to pass the wavelength band whose long- and short-side cut-off wavelengths are respectively the block wavelength of the LVF 141 and the block wavelength of the light block plate 154.

With reference to FIG. 1 again, the light that is not blocked by the light block plate 154 enters the detector 160. The detector 160 is formed using a highly sensitive photoelectric converter element such as a photomultiplier tube.

The detector 160 is configured to output to the information processing apparatus 170 an electric signal corresponding to the intensity of the detected fluorescence. The information processing apparatus 170 includes a controller unit 171, a display unit 172, and input units 173 and 174. The controller unit 171 includes an interface for the detector 160 and is configured to perform image processing to generate an image from the signal obtained from the detector 160 and store and save the generated image.

The display unit 172 is formed by an LCD panel, a CRT device or the like and is configured to display the generated image to a user and perform other operations including displaying a user interface used to allow the user to enter various settings of the microscope 101. The input units 173 and 174 include a text input device such as a keyboard and a pointing device such as a mouse and is configured to be used when the user enters settings, operating instructions and the like into the microscope 101.

Furthermore, the information processing apparatus 170 is also configured to communicate with the control apparatus 180 and to be used as a user interface for the control apparatus 180. The control apparatus 180 maintains the setting values relating to the operations of the galvano scanner 130, the LVF 141, the light dispersing element 152, the detector 160 and the like to control the operations of these units. In addition, the control apparatus 180 may perform all or some of the image processing operations and the like that are originally designed to be performed by the information processing apparatus 170, for the purpose of reducing the load on the information processing apparatus 170. In other words, the control apparatus 180 may perform all or some of the operations that are originally designed to be performed by the controller unit 171 of the information processing apparatus 170.

Alternatively, the controller unit 171 of the information processing apparatus 170 may perform all or some of the operations that are originally designed to be performed by the control apparatus 180.

Figure 6:
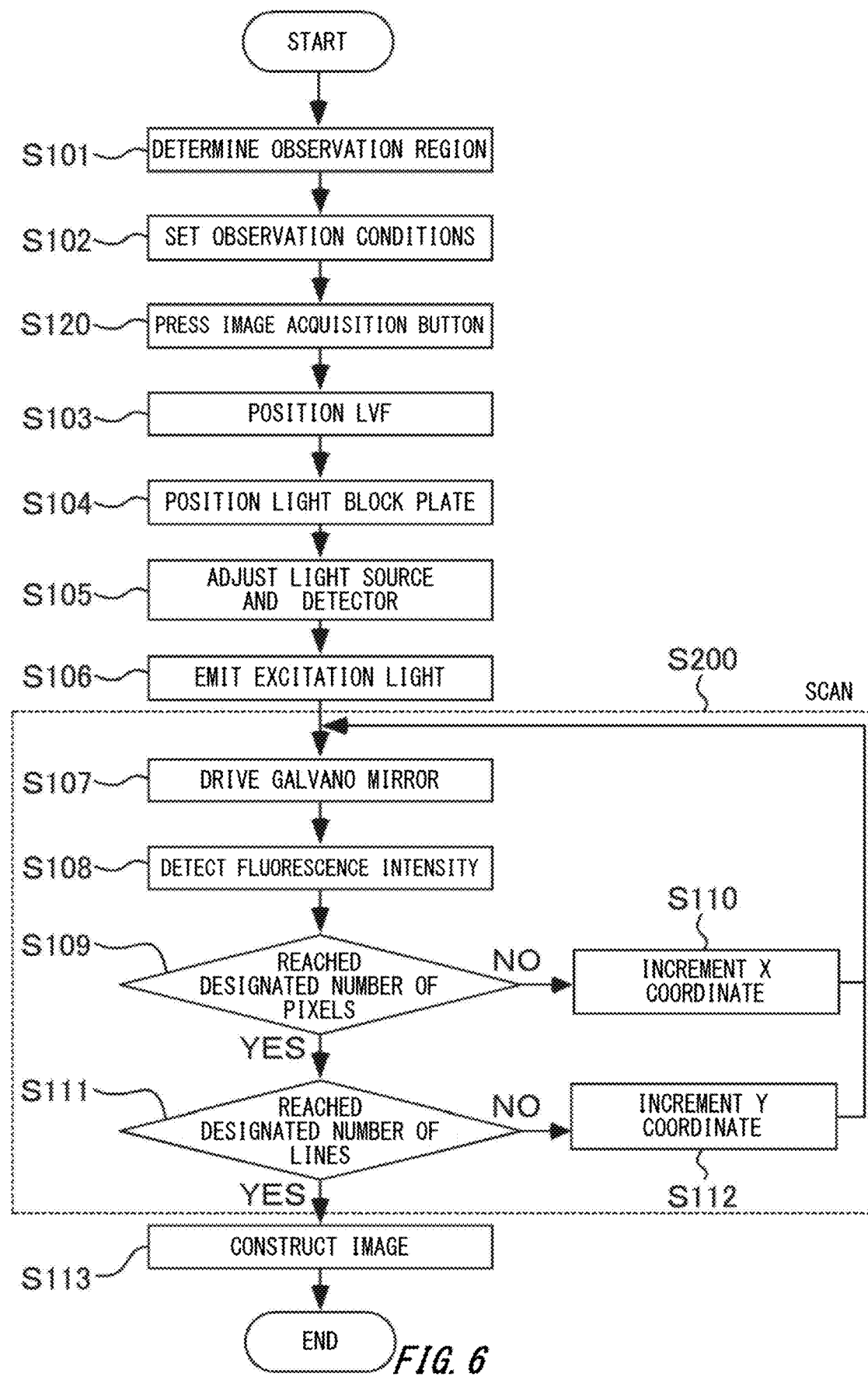
FIG. 6 is a flow chart showing the procedure of observation performed using the microscope 101.
Figure 7:
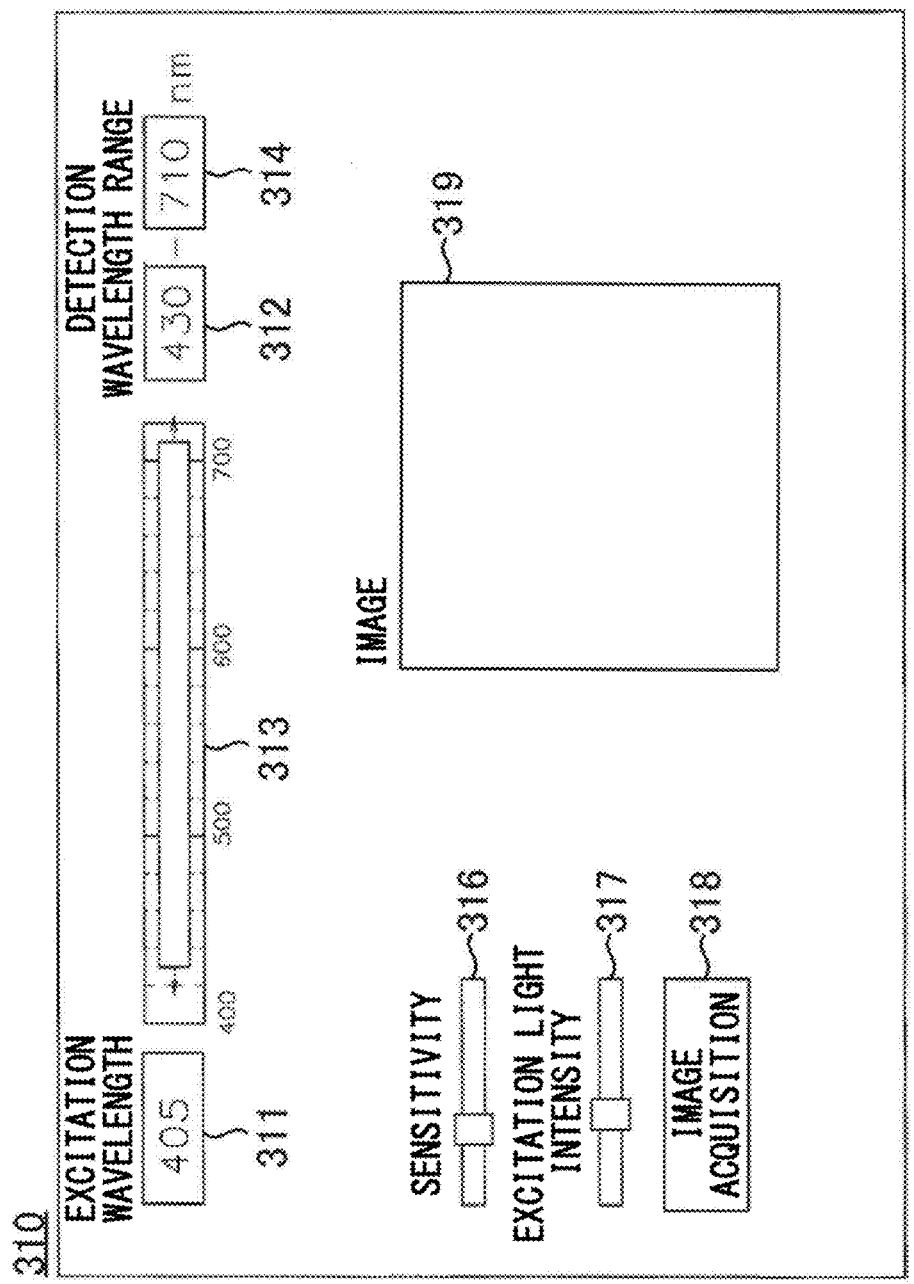
FIG. 7 shows a setting screen 310 of the microscope 101.

FIG. 6 is a flow chart showing the procedure of observing the specimen 210 using the microscope 101 and FIG. 7 shows, as an example, a setting screen 310 used to set the conditions for the observation using the microscope 101. In the example shown in FIGS. 6 and 7, one excitation wavelength is used for each position under observation and the intensity of the resulting fluorescence is detected for each position under observation in one cycle (in one session). The intensity of the fluorescence is detected in one cycle (in one session) for a particular band of wavelengths, which may be referred to as "the detection wavelength range" in the following.

To begin with, the region of the specimen 210 for which the fluorescence observation is to be performed is designated to the microscope 101 (the step S101).

Following this, the user sets the observation conditions for the fluorescence observation (S102). The observation conditions include the wavelength and intensity of the excitation light, the sensitivity of the detector 160 (the applied voltage), the detection wavelength range, a wavelength resolution, which will be described later, and the like. The observation conditions are designated using the input units 173 and 174 on the setting screen 310 displayed on the display unit 172 of the information processing apparatus 170. In other words, the observation conditions are entered into the control apparatus 180 via the setting screen 310.

The setting screen 310 shown in FIG. 7 has an input field 311 for the excitation wavelength, and input fields 312, 313 and 314 for the detection wavelength range. The input field 311 is the region used to set from a pull-down menu the wavelength of the light (the excitation light) emitted from the light source 110. The input field 312 is the region used to set the short-side block wavelength, which is the block wavelength of the light block plate. The input field 314 is the region used to set the long-side block wavelength, which is the block wavelength of the LVF. Numerical values may be entered into these input fields 312 and 314. In the input field 313, the detection wavelength range set in the input fields 312 and 314 is graphically shown. The right and left ends of the the bar representing the detection wavelength range displayed in the input field 313 may be capable of being dragged using the input unit 174 and the like to set the block wavelengths. The numerical values in these input fields 312 and 314 change hand in hand with the bar representing the detection range shown in the input field 313 and vice versa.

The setting screen 310 further has a slider 316 to set the sensitivity of the detector 160 (the applied voltage) and a slider 317 to set the intensity of the excitation light. The sensitivity and the excitation light intensity can be set by dragging the sliders 316 and 317 in the right and left directions using the input unit 174 and the like.

When an image acquisition button 318 in the setting screen 310 is pressed in the step S120, the control of the microscope 101 moves onto the next step S103.

In the step S103, the position of the LVF 141 is set based on the long-side block wavelength, which is set in the above-described step S102. To be more specific, the control apparatus 180 drives the driver 142 based on the data from the information processing apparatus 170 to set the position of the LVF 141 in the y direction. For example, the information processing apparatus 170 or control apparatus 180 may maintain a table or other types of information in which the position of the LVF 141 is associated with the block wavelength. The control apparatus 180 may set the position of the LVF 141 in the y direction by driving the driver 142 based on the information regarding the association between the position of the LVF 141 and the block wavelength.

In addition, the position of the light block plate 154 is set based on the short-side block wavelength, which is set in the above-described step S102 (S104). To be more specific, the control apparatus 180 drives the driver 155 based on the data from the information processing apparatus 170 to set the position of the light block plate 154 in the x direction. For example, the information processing apparatus 170 or control apparatus 180 may maintain a table or other types of information in which the position of the light block plate 154 is associated with the block wavelength. The control apparatus 180 may set the position of the light block plate 154 in the x direction by driving the driver 155 based on the information regarding the association between the position of the light block plate 154 and the block wavelength.

Subsequently, the control apparatus 180 controls the light source 110 to adjust the wavelength, the light emission intensity and the like.

Furthermore, the control apparatus 180 adjusts the voltage to be applied to the detector 160 (S105).

On completion of the preparations for the fluorescence observation described above, the control apparatus 180 controls the light source 110 to start emitting the excitation light (S106) and drives the galvano mirrors 131 and 132 in such a manner to cause the excitation light to illuminate the designated region under observation (S107). In this way, the detector 160 detects the fluorescence having the wavelengths included in the detection wavelength range defined by the LVF 141 and the light block plate 154 (S108).

When the intensity of the fluorescence emitted from the light converged position is detected as a result of the series of operations in the steps S107 and S108, the control apparatus 180 saves the detected intensity and then judges whether the detection has been completed for all of the designated number of pixels forming one scan line in the initially designated region under observation (S109).

If the number of the pixels for which the detection has been completed has not reached the designated number of pixels (S109:NO), the control apparatus 180 increments the number of the detections for the X coordinate (S110) and the control goes back to the step S107. In this manner, the microscope 101 again drives one of the galvano mirrors 131 and 132 to move the light converged position of the excitation light to a different pixel on the same line (S107) and again detects the intensity of the fluorescence (S108).

The operations of these steps S107 and S108 are repeatedly performed, and if the number of the pixels for which the intensity of the fluorescence is detected has reached the designated number of pixels (S109:YES), the control apparatus 180 judges whether the detection has been completed for all of the scan lines in the initially designated region under observation (S111). If the number of the scan lines for which the detection has been completed has not reached the designated number of scan lines (S111:NO), the control apparatus 180 increments the number of the detections for the Y coordinate (S112) and the control goes back to the step S107. Following this, the control apparatus 180 drives the galvano mirrors to move the light converged position of the excitation light to a different scan line and the microscope 101 again detects the intensity of the fluorescence.

If the number of the scan lines for which the intensity of the fluorescence has been detected has reached the designated number of scan lines in the region under observation (S111:YES), the control apparatus 180 constructs an observation image of the region under observation based on the detected fluorescence intensity values (S113). The constructed observation image may be displayed in the region 319 in the setting screen 310 of the display unit 172 or stored in a storage unit (not shown) included in the information processing apparatus 170.

The acquired observation image may be stored in the information processing apparatus 170 and, at the same time, the stored observation image may be displayed in the region 319 of the setting screen 310.

Figure 8:
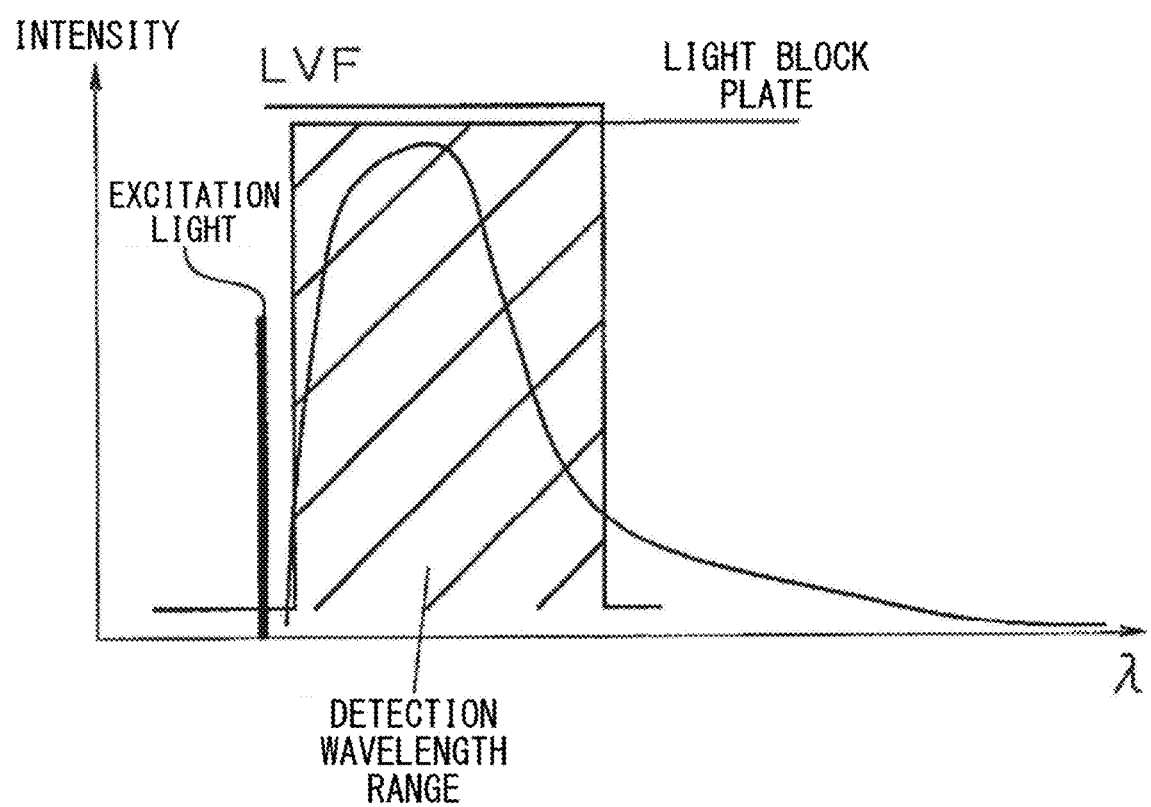
FIG. 8 schematically shows a detection wavelength range of the microscope 101.

FIG. 8 schematically shows the detection wavelength range of the microscope 101. Based on the settings entered in the setting screen 310 shown in FIG. 6, the positions of the LVF 141 and the light block plate 154 are set in the above-described steps S103 and S104, which enables the microscope 101 to detect the fluorescence having the wavelengths in the detection wavelength range corresponding to these positions.

As a consequence, the light entering the detector 160 is exactly the fluorescence that is desired to be observed, that is, a portion of the emitted light emitted from the specimen 210 that is blocked by neither the LVF 141 nor light block plate 154. In addition, the excitation light is reliably filtered out. Accordingly, the detector 160 can detect the fluorescence components of the emitted light with a high S/N ratio.

In the present exemplary embodiment, the description is made taking as an example the case where the LVF 141 blocks the longer wavelengths and the light block plate 154 blocks the shorter wavelengths.

In other words, the excitation light, which has a shorter wavelength than the fluorescence and high intensity, is physically blocked by the light block plate 154. Accordingly, when compared with the case where the LVF 141 is configured to block the excitation light, the present embodiment can more reliably (more efficiently) block the excitation light.

Furthermore, for example, when a prism is used as the light dispersing element 152, the difference in emission angle between the wavelengths decreases as the wavelengths get longer. In other words, as the wavelengths get shorter, the difference in emission angle between the wavelengths increases. Accordingly, when the light block plate 154 is configured to block the shorter wavelengths, the wavelengths can be blocked with higher resolution than when the light block plate 154 is configured to block the longer wavelengths.

In the present exemplary embodiment, the light block plate 154 is configured to block the shorter wavelengths of the light beams resulting from the dispersion by the prism. Accordingly, the light blocking resolution can be further improved than when the light block plate 154 is configured to block the longer wavelengths.

For the above reasons, when the LVF 141 is configured to block the longer wavelengths and the light block plate 154 is configured to block the shorter wavelengths, the excitation light can be reliably blocked and the light blocking resolution can be also improved. In other words, when the LVF 141 is configured to block the longer wavelengths and the light block plate 154 is configured to block the shorter wavelengths, the light blocking characteristics can be enhanced.

While a prism is used as the light dispersing element 152 in the above-described example, a diffraction grating may be alternatively used as the light dispersing element 152. The diffraction grating may be a transmissive or reflective diffraction grating. When a diffraction grating is used as the light dispersing element 152, the microscope 101 may be configured such that the LVF 141 blocks the shorter wavelengths and the light block plate 154 blocks the longer wavelengths.

Note that, when a prism is used as the light dispersing element 152, the microscope 101 may be also configured such that the LVF 141 blocks the shorter wavelengths and the light block plate 154 blocks the longer wavelengths.

The foregoing describes the method of acquiring an image for a single detection wavelength range, but the present embodiment may be alternatively configured to designate in advance a plurality of wavelength bands so as to acquire images corresponding to the plurality of detection wavelength ranges.

The following describes a specific example incorporating this alternative configuration.

Figure 9:
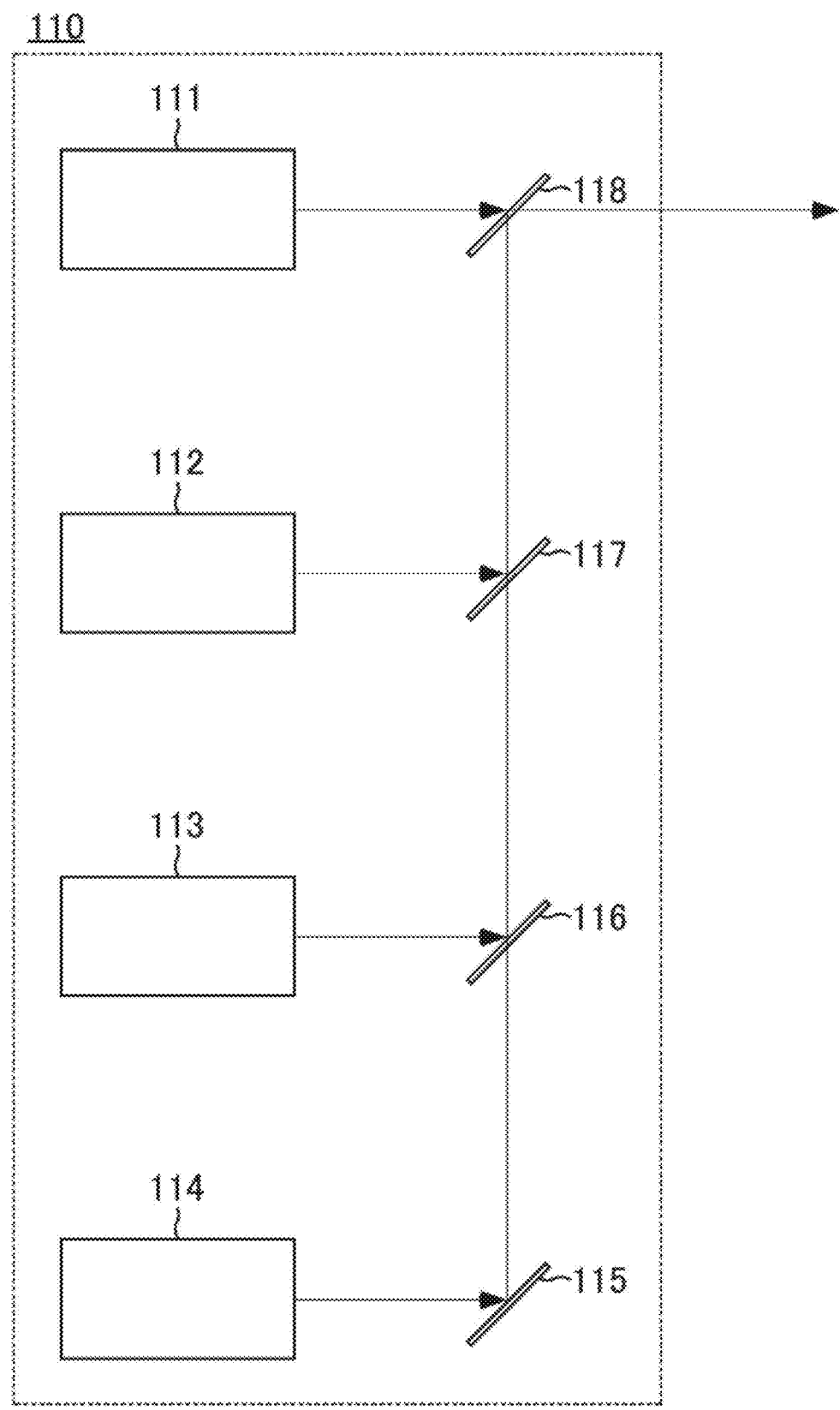
FIG. 9 schematically shows a different example of a light source 110.
Figure 10:
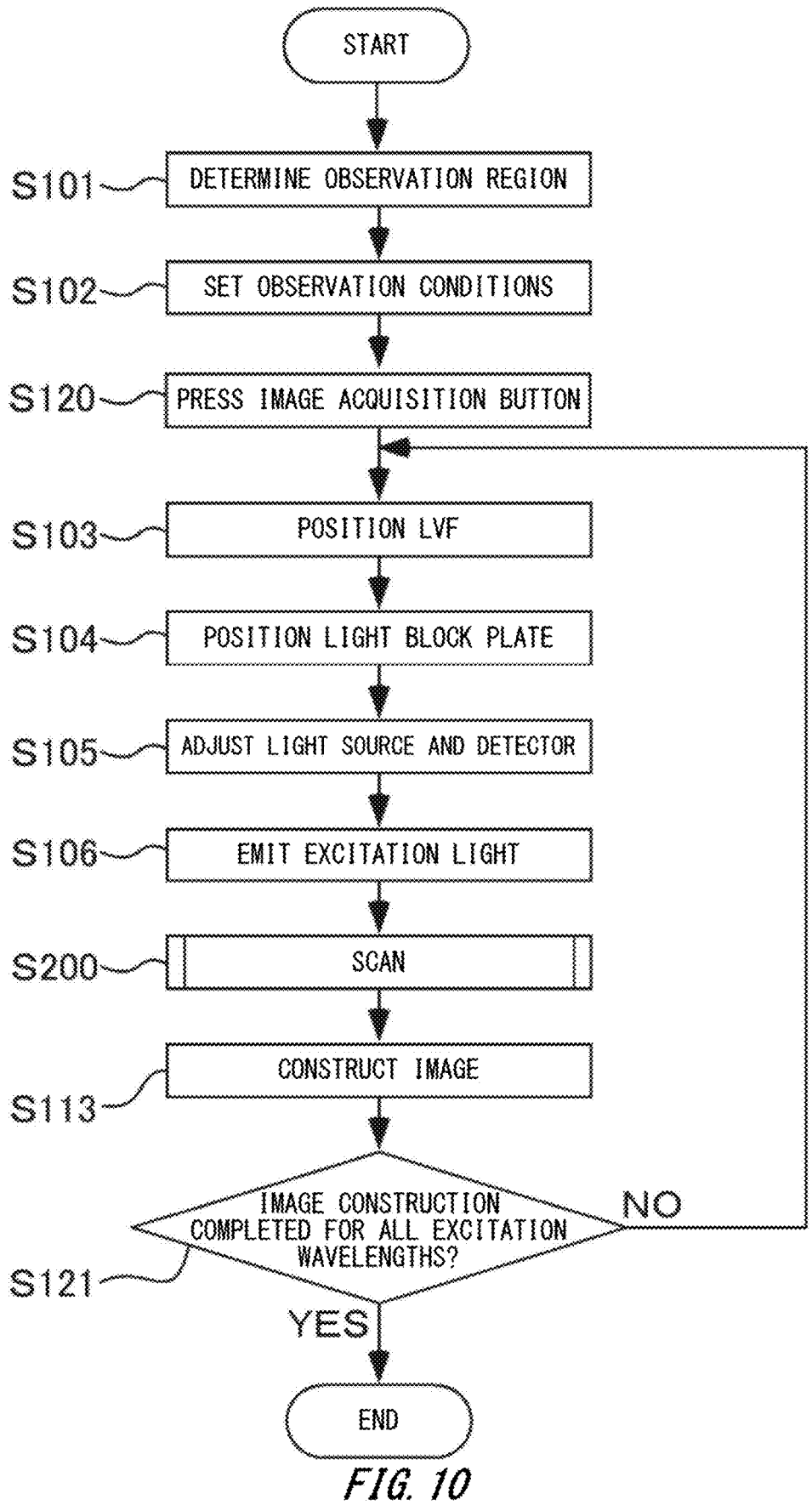
FIG. 10 is a flow chart showing the procedure of observation performed using the microscope 101.
Figure 11:
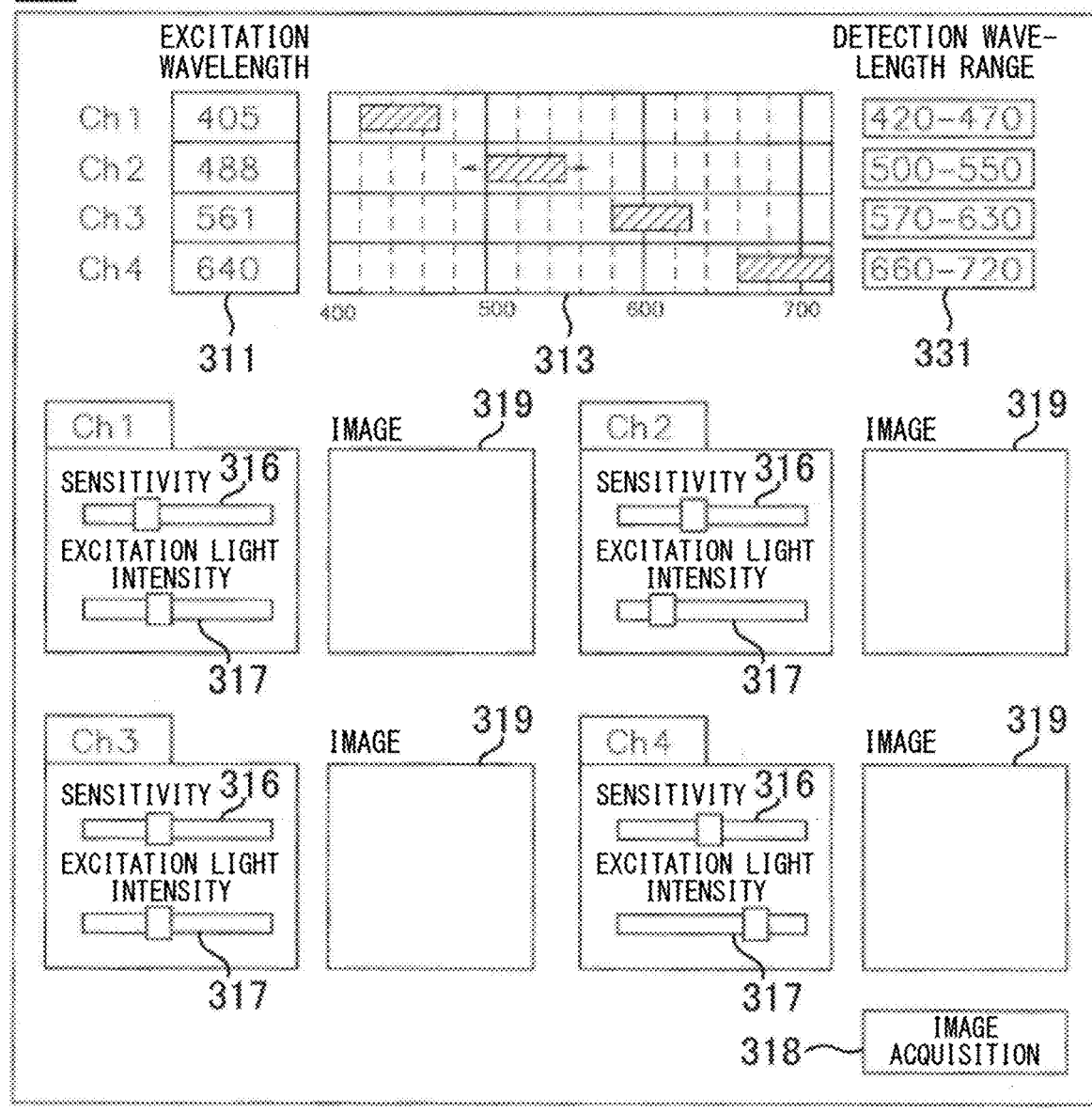
FIG. 11 shows a setting screen 330 of the microscope 101.

FIG. 9 schematically shows a different example of the light source 110, FIG. 10 is a flow chart showing the procedure of observation using the microscope 101, which is associated with the light source 110 shown in FIG. 9, and FIG. 11 shows a setting screen 330 associated with the procedure shown in FIG. 10. In FIGS. 9 to 11, the same constituents and operations as the corresponding ones shown in FIGS. 1 to 8 are assigned with the identical reference numerals and not described again. For the sake of simplicity, FIG. 10 collectively refers to the steps S107 to S112 shown in FIG. 6 as the scan operation (S200).

In the example shown in FIG. 9, the light source 110 includes four laser light sources 111, 112, 113 and 114 that are configured to emit light beams of different wavelengths from each other. For example, the laser light emitted from the laser light source 111 has a wavelength of 405 nm, the laser light emitted from the laser light source 112 has a wavelength of 488 nm, the laser light emitted from the laser light source 113 has a wavelength of 561 nm and the laser light emitted from the laser light source 114 has a wavelength of 640 nm.

A mirror 115 is configured to reflect the laser light emitted from the laser light source 114. A dichroic mirror 116 is configured to transmit the laser light reflected by the mirror 115 and reflect the laser light emitted from the laser light source 113. A dichroic mirror 117 is configured to transmit the laser light that has passed through the dichroic mirror 116 and the laser light that is reflected by the dichroic mirror 116, and reflect the laser light emitted from the laser light source 112. A dichroic mirror 118 is configured to reflect the laser light that has passed through the dichroic mirror 117 and the laser light that is reflected by the dichroic mirror 117, and transmit the laser light emitted from the laser light source 111.

With reference to the observation procedure shown in FIG. 10, the conditions for the observation are set in the step S102. Correspondingly to the fact that the light source 110 shown in FIG. 9 has the four laser light sources 111, 112, 113 and 114, the selectable observation conditions include the wavelengths of the four excitation light beams. In this case, the specimen 210 is configured to contain four different types of fluorescent materials that can be excited by the different excitation light beams.

Referring to the setting screen shown in FIG. 11, an input field 311 is the region used to set the wavelengths of the excitation light beams. To be more specific, the input field 311 is the region to set from a pull-down menu the wavelengths of the light beams (excitation light beams) emitted from the light source 110 and has a plurality of input regions. According to the shown example, four values from CH1 to CH4 can be set correspondingly to the fact that there are four laser light sources. This means that four different types of excitation wavelengths can be set using CH1 to CH4. In order to enter values into the input field 311, the input units 173 and 174 of the information processing apparatus 170 can be used. The number of the excitation light wavelengths can be freely selected and not limited to four.

An input field 331 is the region used to input the upper- and lower-limit numerical values of the detection wavelength ranges by entering the numerical values indicative of the block wavelengths of the LVF 141 and light block plate 154. In order to enter values into the input field 331, the input units 173 and 174 of the information processing apparatus 170 can be also used. Furthermore, the input field 331 also has a plurality of regions. In the shown example, four ranges can be set correspondingly to the different excitation light wavelengths.

In an input field 313, the detection wavelength ranges set in the input field 331 are graphically shown. The right and left ends of the bars representing the detection wavelength ranges displayed in the input field 313 may be capable of being dragged using the input unit 174 and the like to set the block wavelengths. The numerical values in the input field 331 change hand in hand with the bars representing the detection ranges shown in the input field 313.

If the image acquisition button 318 is pressed (S120: YES), the microscope 101 starts an image acquisition procedure, which is the same as in the observation procedure shown in FIG. 6 (S103 and the following steps). By referring to the detection wavelength ranges set in the step S102, the microscope 101 drives the driver 142 to position the LVF 141 in the y direction (S103) and drives the driver 155 to position the light block plate 154 in the x direction (S104).

If a plurality of wavelengths are set for the light source 110 and a plurality of light reception bands are set for the detector 160 in the step S102, the control apparatus 180 performs such controls that the specimen 210 is automatically observed multiple times sequentially by using the plurality of excitation wavelengths and the plurality of corresponding detection wavelength ranges (S121) to construct observation images.

To be specific, in the step S121, the control apparatus 180 judges whether image construction has been completed for all of the preset excitation wavelengths (in the example shown in FIG. 11, the four excitation wavelengths). If the image construction has been completed for all of the preset excitation wavelengths (in the example shown in FIG. 11, the four excitation wavelengths), the procedure ends. Otherwise, the control goes back to the step S103.

Figure 12:
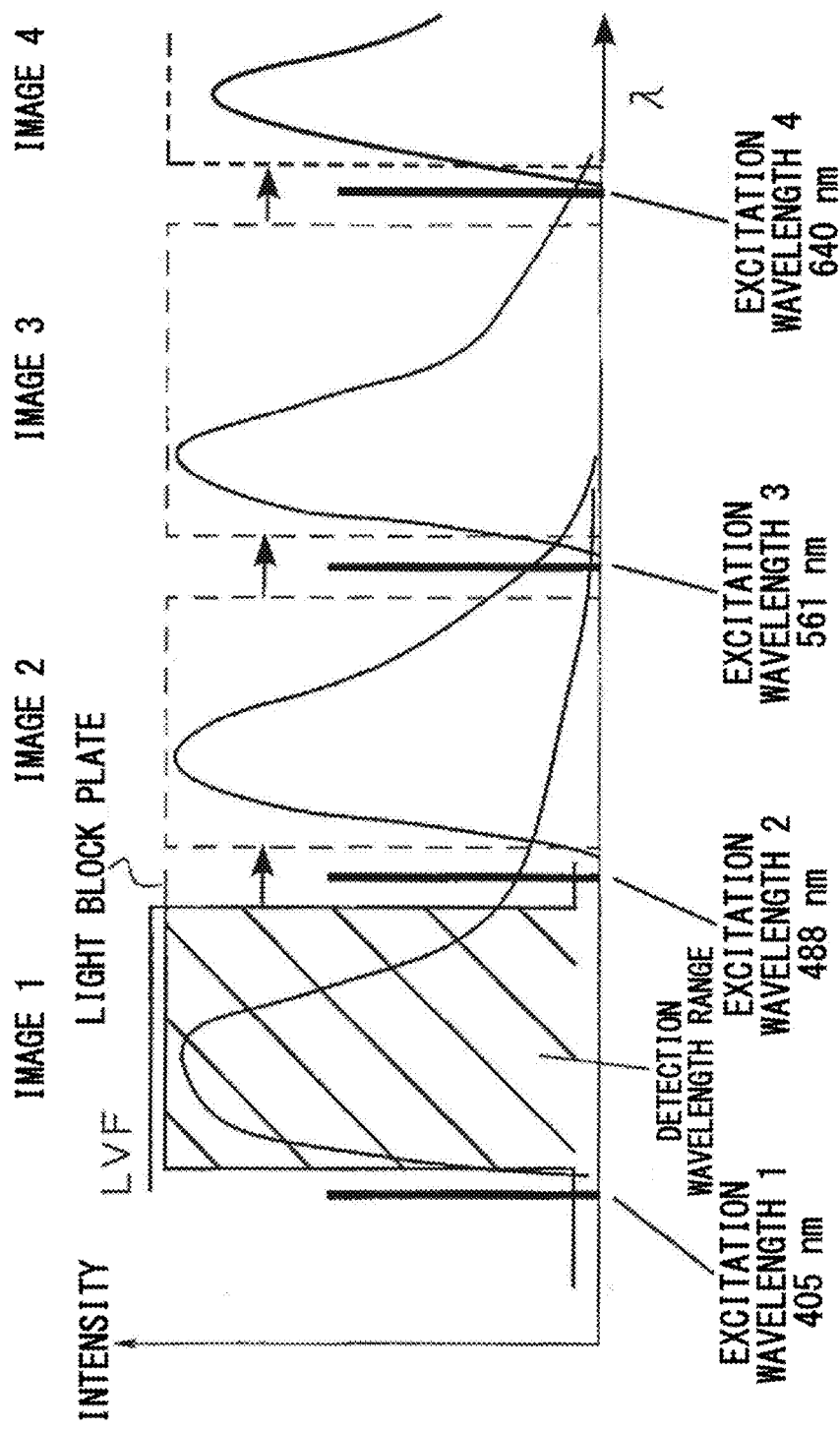
FIG. 12 is a graph showing how the microscope 101 operates.

FIG. 12 is a graph showing how the microscope 101 operates under the observation conditions set as shown in the setting screen 310 of FIG. 11. The control apparatus 180 switches the wavelength to be emitted from the light source 110 and the detection wavelength range indicating the wavelengths to be received by the detector 160 in synchronization with each other, so that the fluorescence beams of different wavelength bands are sequentially detected. According to the shown example, the fluorescence beams satisfying the four detection wavelength ranges are detected in a one-to-one correspondence with the four excitation light beams.

In the shown case, to begin with, the position of the LVF 141 in the y direction and the position of the light block plate 154 in the x direction are set based on such settings that the excitation light wavelength is set at 405 nm and the detection wavelength range is set at 420 nm to 470 nm. While the laser light source 111 emits toward the specimen 210 the excitation light having a wavelength of 405 nm, the detector 160 receives light having wavelengths of 420 nm to 470 nm. In this manner, the fluorescence of the above-mentioned wavelength band is detected. Furthermore, under the control of the control apparatus 180, the fluorescence detection is repeatedly performed while the galvano scanner 130 moves the light converged position at which the excitation light is converged. In this manner, the microscope 101 can acquire an observation image formed by the fluorescence generated by the excitation light having a wavelength of 405 nm.

Following this, the position of the LVF 141 in the y direction and the position of the light block plate 154 in the x direction are set based on such settings that the excitation light wavelength is set at 488 nm and the detection wavelength range is set at 500 nm to 550 nm. Under the control of the control apparatus 180, the fluorescence detection is performed while the laser light source 112 emits toward the specimen 210 the excitation light having a wavelength of 488 nm. Furthermore, the fluorescence detection is repeatedly performed while the galvano scanner 130 moves the light converged position at which the excitation light is converged. In this manner, the microscope 101 can acquire an observation image formed by the fluorescence generated by the excitation light having a wavelength of 488 nm.

Subsequently, the control apparatus 180 sequentially switches the wavelength of the light source 110 to 561 nm and to 640 nm, which are set in the setting screen 310. In this way, the microscope 101 acquires observation images formed by the fluorescence in the wavelength band of 570 nm to 630 nm and the fluorescence in the wavelength band of 660 nm to 720 nm.

In the above-described manner, although the configurations are simplified, the microscope 101 can acquire a plurality of images corresponding to a plurality of detection wavelength ranges, which are associated with a plurality of excitation wavelengths. In the embodiment shown in FIGS. 9 to 12, the respective laser light sources 111, 112, 113 and 114 emit laser light beams in a sequential manner. Alternatively, while all of the laser light sources may be controlled to concurrently emit the respective laser light beams, the positions of the LVF 141 and the light block plate 154 may be sequentially changed.

In the embodiment shown in FIGS. 9 to 12, the excitation wavelength is switched after image construction is completed. As an alternative example, the excitation wavelength may be switched when each line is completely scanned.

The foregoing description is directed to the operating method to acquire a plurality of images in a one-to-one correspondence with a plurality of excitation light beams corresponding to a plurality of fluorescent materials. The microscope 101, however, can acquire a fluorescence spectral distribution of the specimen 210 in such a manner that one cycle (one session) of detection is performed for a narrowed detection wavelength range and fluorescence images are sequentially acquired in a similar manner.

Figure 13:
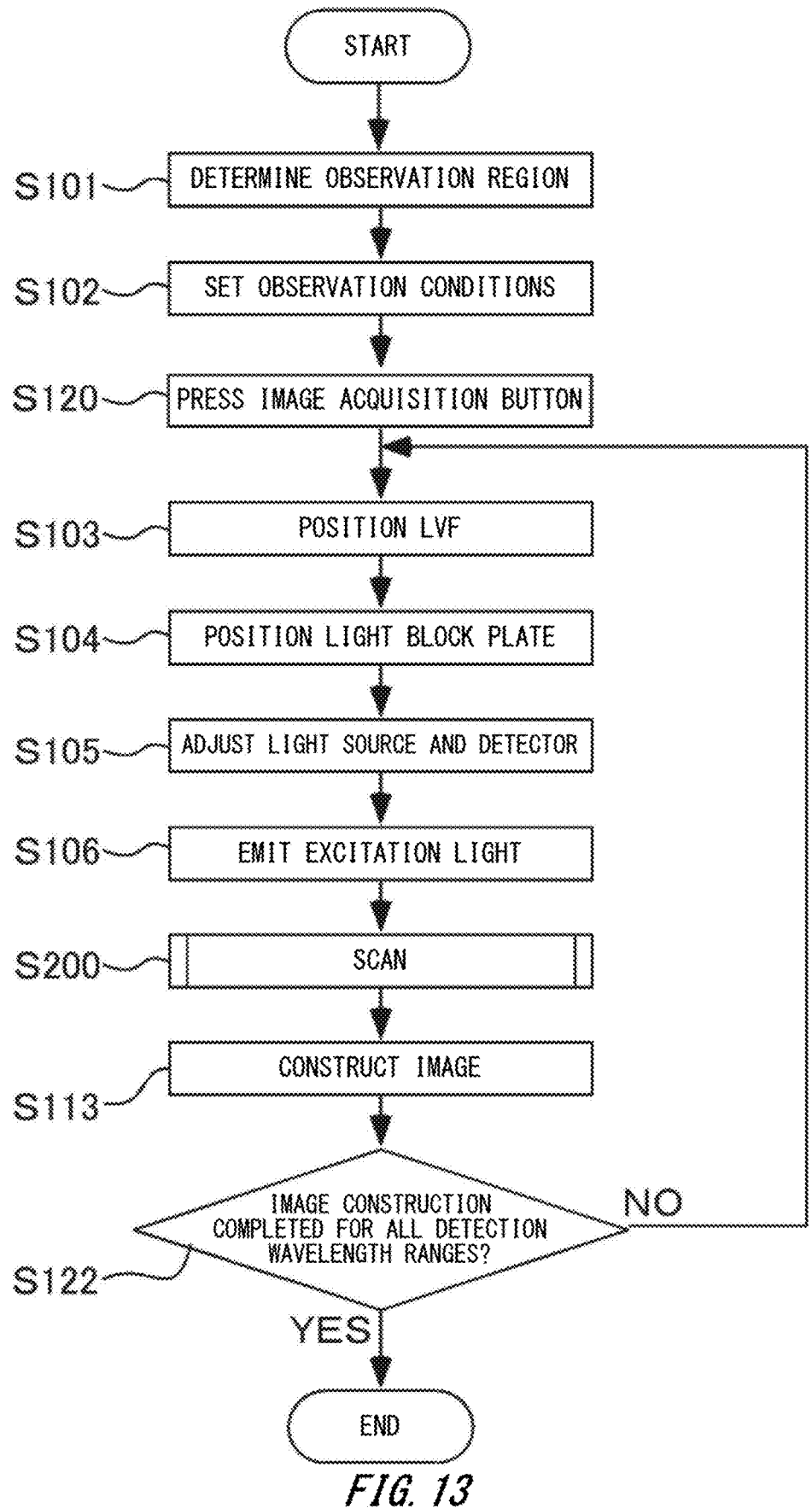
FIG. 13 is a flow chart showing the procedure of observation performed by using the microscope 101.
Figure 14:
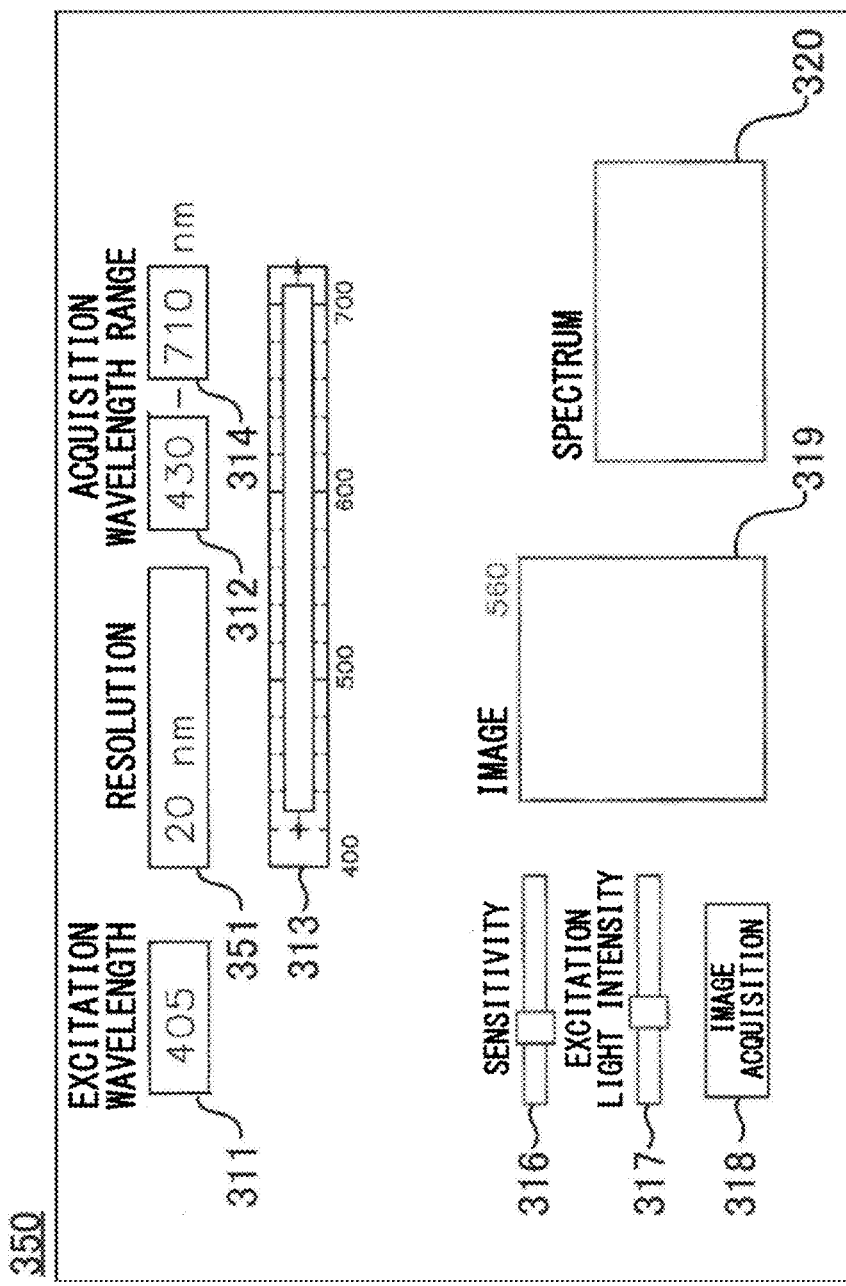
FIG. 14 shows a setting screen 350 of the microscope 101.

FIG. 13 is a flow chart showing how to acquire a fluorescence spectral distribution using the microscope 101, and FIG. 14 shows a setting screen 350 corresponding to FIG. 13. n FIGS. 13 and 14, the same constituents and operations as the corresponding ones shown in FIGS. 1 to 12 are assigned with the identical reference numerals and not described again.

According to this observation procedure, the fluorescence is acquired a plurality of times while the settings of the LVF 141 and the light block plate 154 are changed. Here, one cycle (one session) of detection is performed over a wavelength range having a width of 20 nm, and the detection is repeatedly performed 14 times so as to acquire a fluorescence spectrum profile for the range of 430 nm to 710 nm.

The setting screen 350 shown in FIG. 14 is displayed in the display unit 172 when the observation conditions are set in the step S102 shown in FIG. 13. An input field 311 has the same layout as the input field 311 of the setting screen 310 shown in FIG. 7 and enables the user to set the wavelength of the light emitted from the light source 110 (the excitation light). In the shown example, the wavelength of 405 nm is designated. In order to enter values into the input field 311, the input units 173 and 174 of the information processing apparatus 170 can be used.

Input fields 312 and 314 are the regions used when numerical values are input to set the wavelength range over which the spectrum of fluorescence emitted from the specimen 210 is acquired. In order to enter values into the input fields 312 and 314, the input units 173 and 174 of the information processing apparatus 170 can be used. The input field 312 is the region used to enter the short-side wavelength end of the acquisition wavelength range, and the input field 314 is the region used to enter the long-side wavelength end. In the shown example, the acquisition wavelength range is set to span from the wavelength of 430 nm to the wavelength of 710 nm.

An input field 351 is used to set the width of the detection wavelength range that is part of the acquisition wavelength range set using the above-mentioned input fields 312 and 314 and over which one cycle (one session) of detection is performed to detect a fluorescence spectrum. Note that, in the present embodiment, the width of the detection wavelength range is equivalent to the wavelength resolution of the fluorescence spectrum profile. In the shown exemplary settings, the fluorescence intensity is detected for each wavelength width of 20 nm. Therefore, it is designated that the detection is to be performed for 14 different bands over the wavelength band from 430 nm to 710 nm in this example. Note that, in place of the width of the detection wavelength range, the number of bands within the acquisition wavelength range, which is set in the above-mentioned input fields 312 and 314, may be input. In this case, the wavelength resolution is automatically set based on the input number of bands.

In an input field 313, the acquisition wavelength range and wavelength resolution set in the input fields 351, 312 and 314 are graphically displayed, and the bar displayed in the input field 313 can be directly manipulated to input the wavelength range over which the fluorescence spectrum is acquired. The numerical values in the input fields 312 and 314 change hand in hand with the bar displayed in the input field 313.

Figure 15:
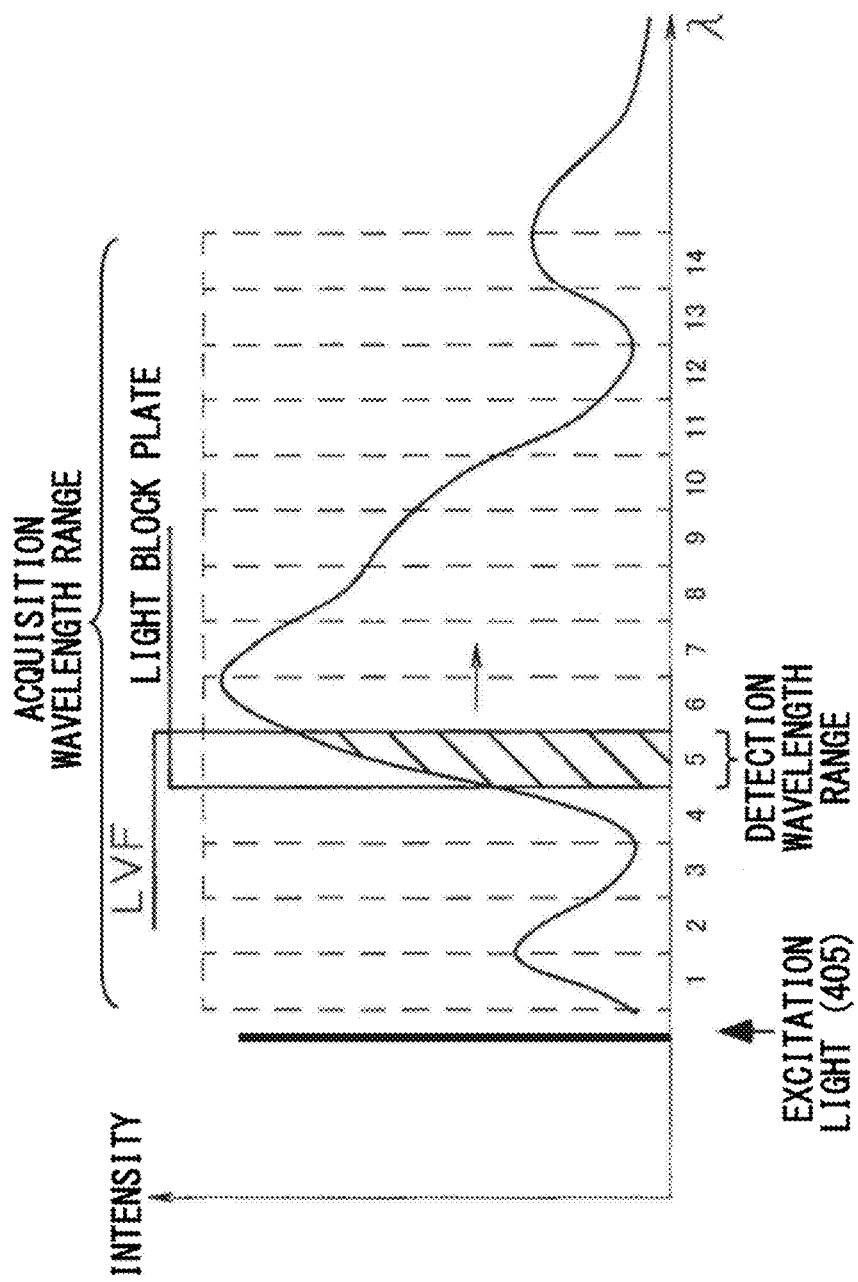
FIG. 15 shows how the microscope 101 operates.

FIG. 15 is a schematic view to describe the acquisition wavelength range and detection wavelength range corresponding to the observation conditions set in the setting screen 350 shown in FIG. 14. When the fluorescence spectrum is acquired under such conditions, excitation light having a wavelength of 405 nm, which is designated in the input field 311, is emitted toward the specimen 210. Furthermore, over the acquisition wavelength range from 430 nm to 710 nm, which are designated in the input fields 312 and 314, a fluorescence image is acquired with the wavelength resolution (the width of the detection wavelength range) designated in the input field 351, or for a 20-nm wide wavelength range 14 times.

In this case, the wavelengths shorter than each detection wavelength range are blocked by the light block plate 154, and the wavelengths longer than each detection wavelength range are blocked by the LVF 141. In other words, under the control of the control apparatus 180, the light block plate 154 blocks the band of wavelengths shorter than the lower limit of each detection wavelength range, and the LVF 141 blocks the band of wavelengths longer than the upper limit. In addition, on completion of fluorescence image acquisition for each detection wavelength range, the drivers 142 and 155 are both operated to select, as the detection wavelength range, the wavelength band adjacent to the wavelength band for which the fluorescence intensity has been detected (steps S122, S103 and S104 in FIG. 13).

Figure 16:
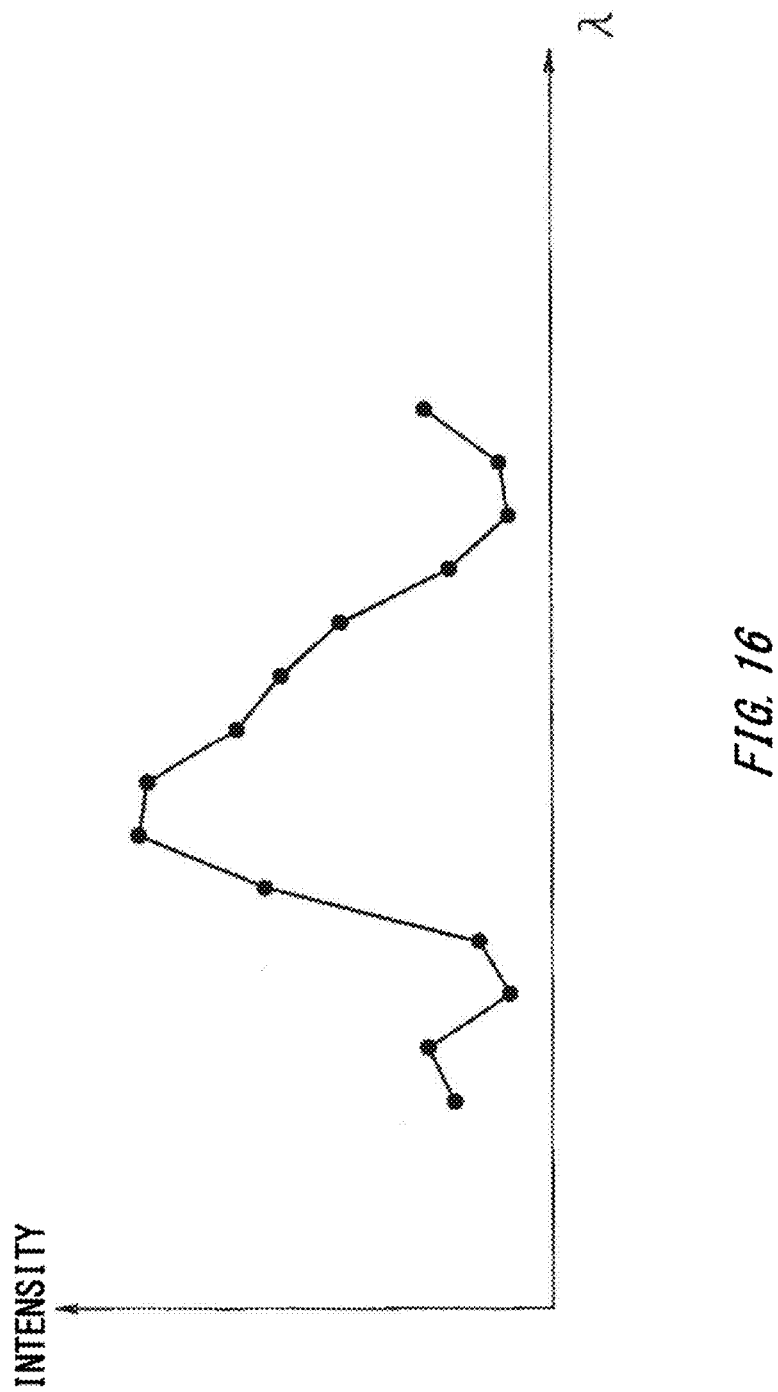
FIG. 16 shows the results detected by the microscope 101.

FIG. 16 shows, as an example, a fluorescence spectrum profile of a portion of the specimen 210 that is detected by the microscope 101. The microscope 101 repeatedly perform the above-described series of operations so as to detect the fluorescence intensity for each of a plurality of detection wavelength ranges. Accordingly, the spectrum profile can be generated for the respective detected portions of the specimen 210 as shown in FIG. 16 by plotting the fluorescence intensity values of the detected images in the graph in which the horizontal axis represents the wavelength and the vertical axis represents the intensity. The spectrum profile is displayed in a region 320, for example. Note that the fluorescence intensity values (the light emission intensity values) detected for the respective detection wavelength ranges may be added together to produce a two-dimensional image and the two-dimensional image may be additionally displayed in a region 319 of the setting screen 350.

Figure 17:
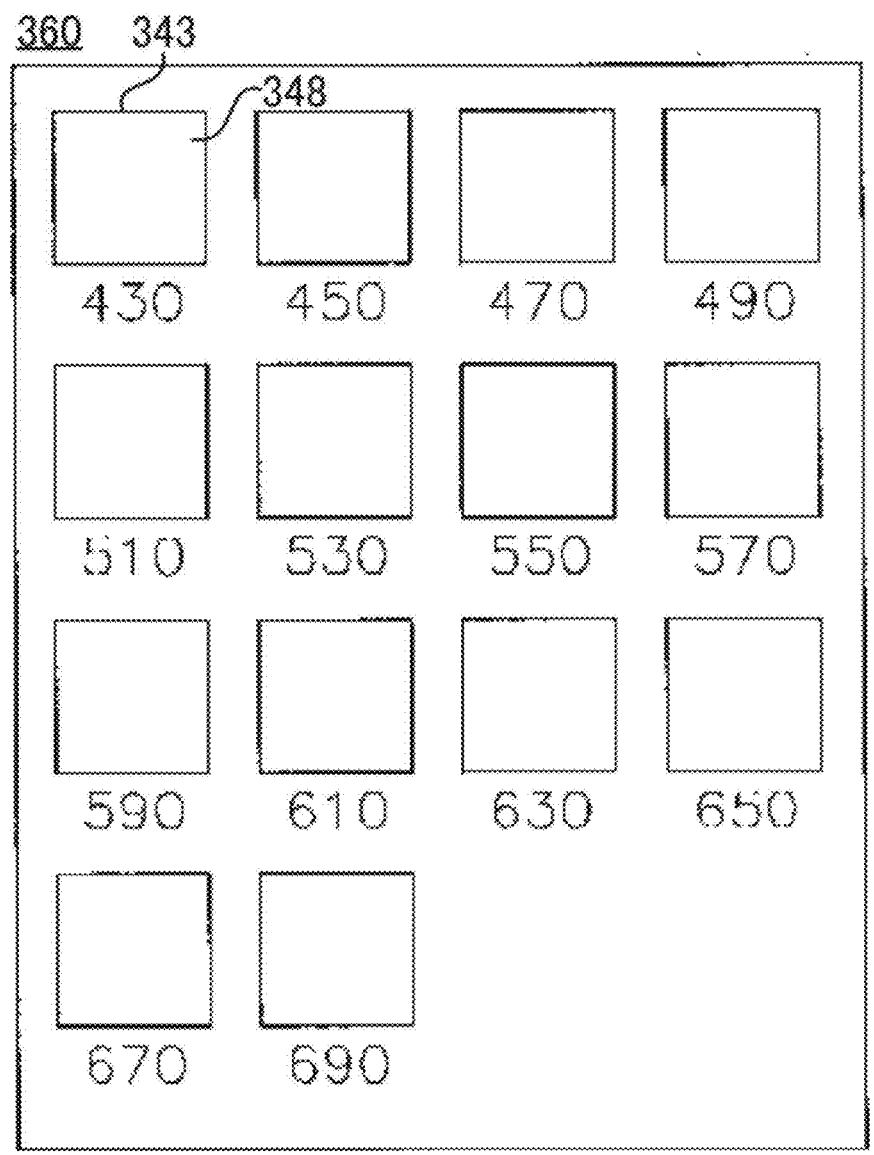
FIG. 17 shows a display image 360 of the microscope 101.

FIG. 17 shows, as an example, a display image 360 that displays the images acquired in the embodiment described with reference to FIGS. 14 to 16. An observation image 348 is constructed for a predetermined detection wavelength range. The display image 360 includes a plurality of image display fields 343 designed to display in tiles the plurality of observation images 348 that are constructed for the different detection wavelength ranges. This enables the user to view all of the observation images 348 for the respective detection wavelength ranges at a time.

Figure 18:
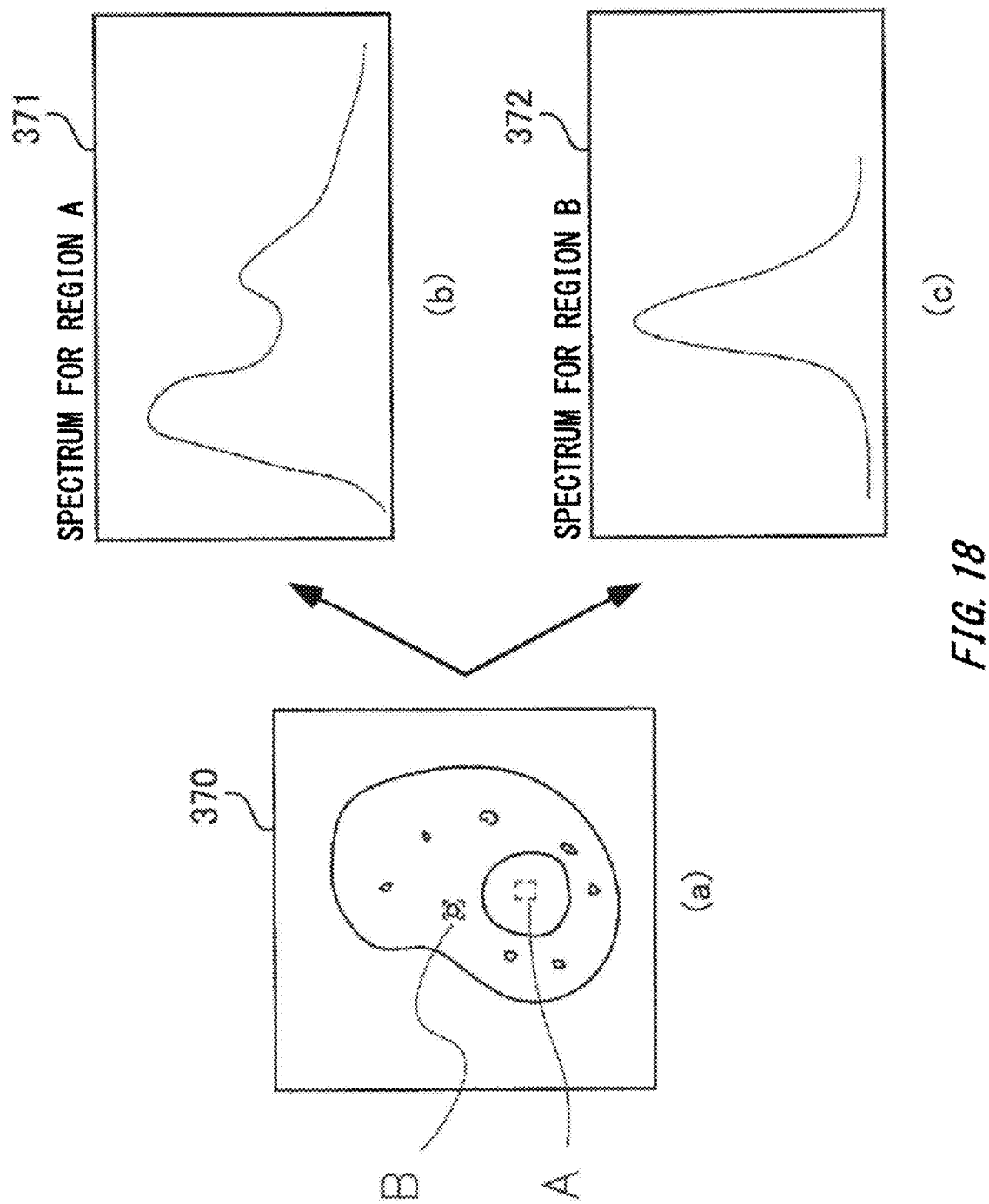
FIG. 18 shows a display image 370 of the microscope 101.

FIG. 18 shows, as an example, different display images 370, 371 and 372 designed to display the images acquired in the embodiment described with reference to FIGS. 14 to 16. The display image 370 is a two-dimensional image, on which regions A and B may be defined. The fluorescence intensity values in the regions A and B may be averaged or integrated, and the results may be plotted relative to each detection wavelength range. In this manner, the fluorescence spectrum profiles of the regions A and B defined on the specimen 210 can be obtained, which are respectively shown in the display images 371 and 372.

Figure 19:
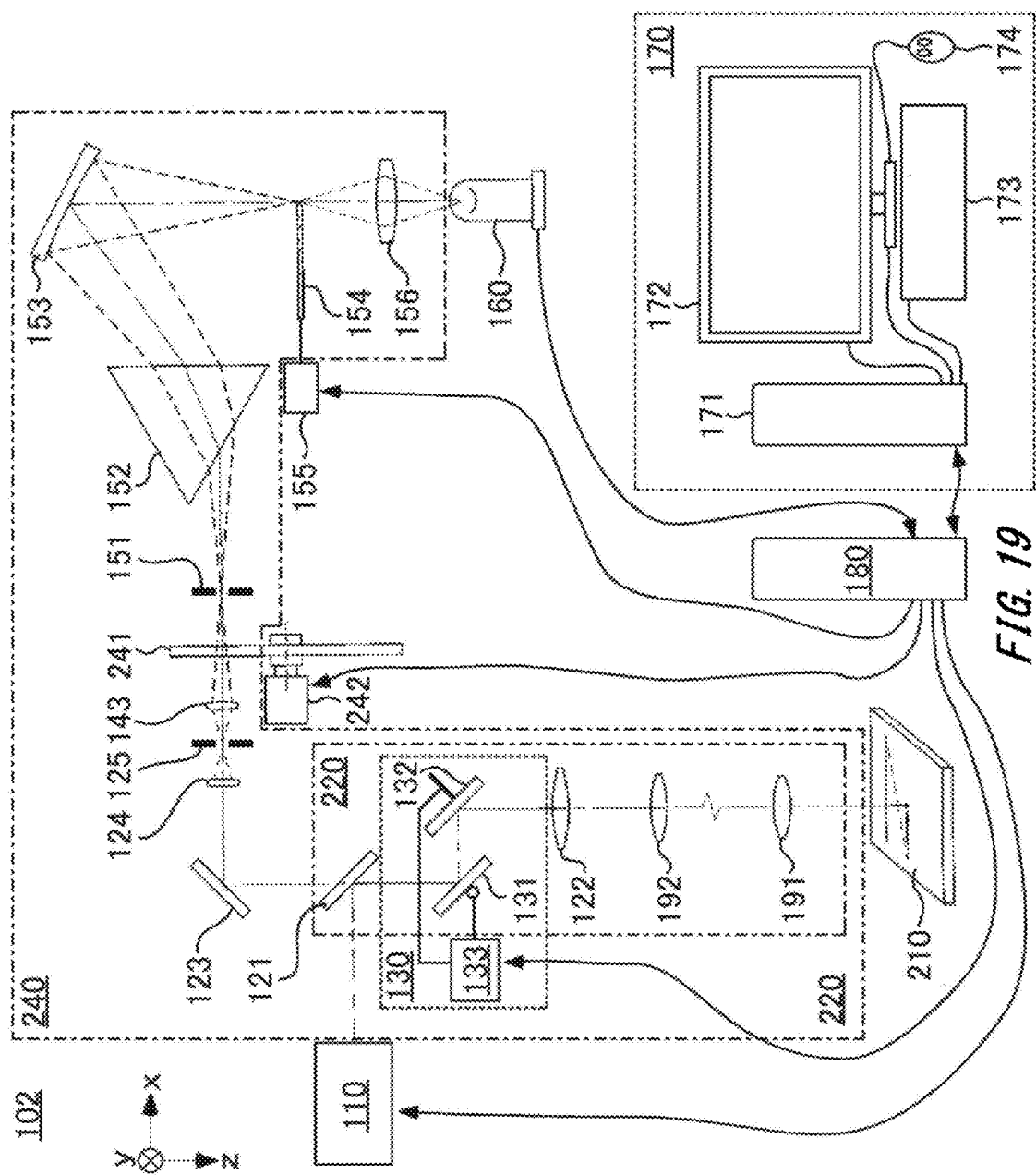
FIG. 19 schematically shows a microscope 102.

FIG. 19 schematically shows a differently structured microscope 102. The microscope 102 has the same structure as the microscope 101 shown in FIG. 1 except for the configurations described in the following. Accordingly, the elements the microscope 102 has in common with the microscope 101 are assigned with the identical reference numerals and not described again.

The microscope 102 has a circular LVF 241 in place of the LVF 141. The microscope 102 has a rotation driver 242 in place of the driver 142.

Figure 20:
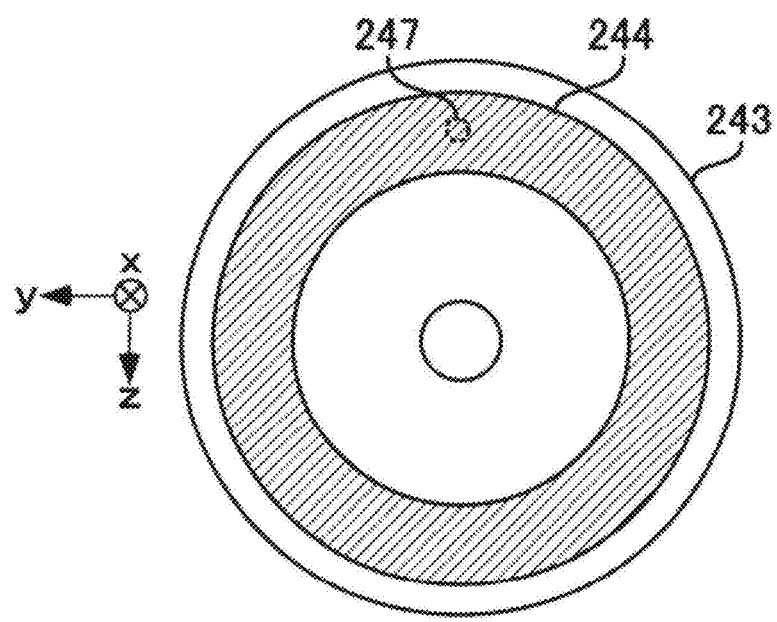
FIG. 20 is a front view showing a circular LVF 241.

FIG. 20 shows the circular LVF 241 when seen from the direction intersecting the propagation direction of the emitted light entering the circular LVF 241. The circular LVF 241 is constituted by a transparent circular plate 243 and an annular dielectric film 244.

The transparent circular plate 243 is rotated by the rotation driver 242 and transparent to the wavelength band of the emitted light. The annular dielectric film 244 is formed on the transparent circular plate 243 concentrically with the transparent circular plate 243 and supported by the transparent circular plate 243. The thickness of the annular dielectric film 244 continuously varies in the circumferential direction. In this way, the annular dielectric film 244 provides an LVF the block wavelength of which continuously varies in the circumferential direction. With such configurations, as a result of the rotation of the transparent circular plate 243 caused by the rotation driver 242, a spot 247 of the emitted light, which is on the annular dielectric film 244, can be positioned on the portion of the annular dielectric film 244 that has a desired block wavelength.

In the above-described manner, the microscope 102 can be constituted by an LVF having a simplified structure. Furthermore, since the block wavelength of the circular LVF 241 can be varied without changing the direction of its movement, less vibration and noise may be caused by the circular LVF 241.

Figure 21:
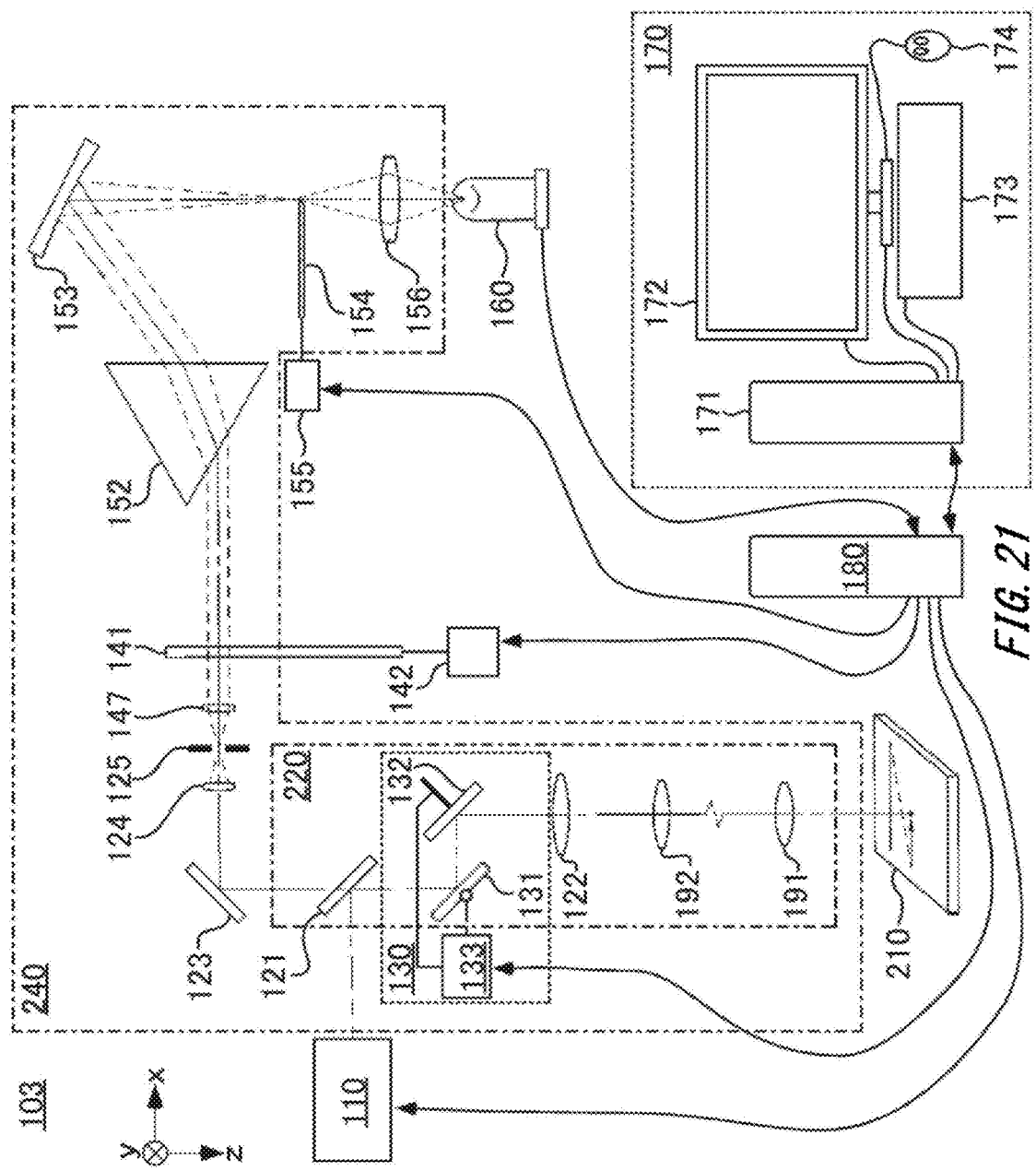
FIG. 21 schematically shows a microscope 103.

FIG. 21 schematically shows a further different microscope 103. The microscope 103 has the same structure as the microscope 101 shown in FIG. 1 except for the configurations described in the following. Accordingly, the elements the microscope 103 has in common with the microscope 101 are assigned with the identical reference numerals and not described again.

The microscope 103 has a different structure than the microscope 101 in that a collimator lens 147 is provided between the first pinhole 125 and the LVF 141. The collimator lens 147 is configured to render the emitted light travelling from the first pinhole 125 into parallel beams of light. In this manner, the emitted light entering the LVF 141 can be parallel beams of light.

This can prevent the deterioration of the wavelength selectivity that may be caused by the oblique incidence on the interference film of the LVF.

In the microscope 103, the emitted light that leaves the LVF 141 and subsequently enters the light dispersing element 152 is also parallel beams of light. Accordingly, the second pinhole 151 on the entrance side of the light dispersing element 152 is omitted.

If the light beams incident on the light dispersing element 152, which is a prism, includes oblique incident light beams, different aberrations are generated for the respective wavelengths. Since the emitted light entering the light dispersing element 152 is parallel beams of light, the present embodiment can prevent the complexity in optically designing the elements after the light dispersing element 152.

Figure 22:
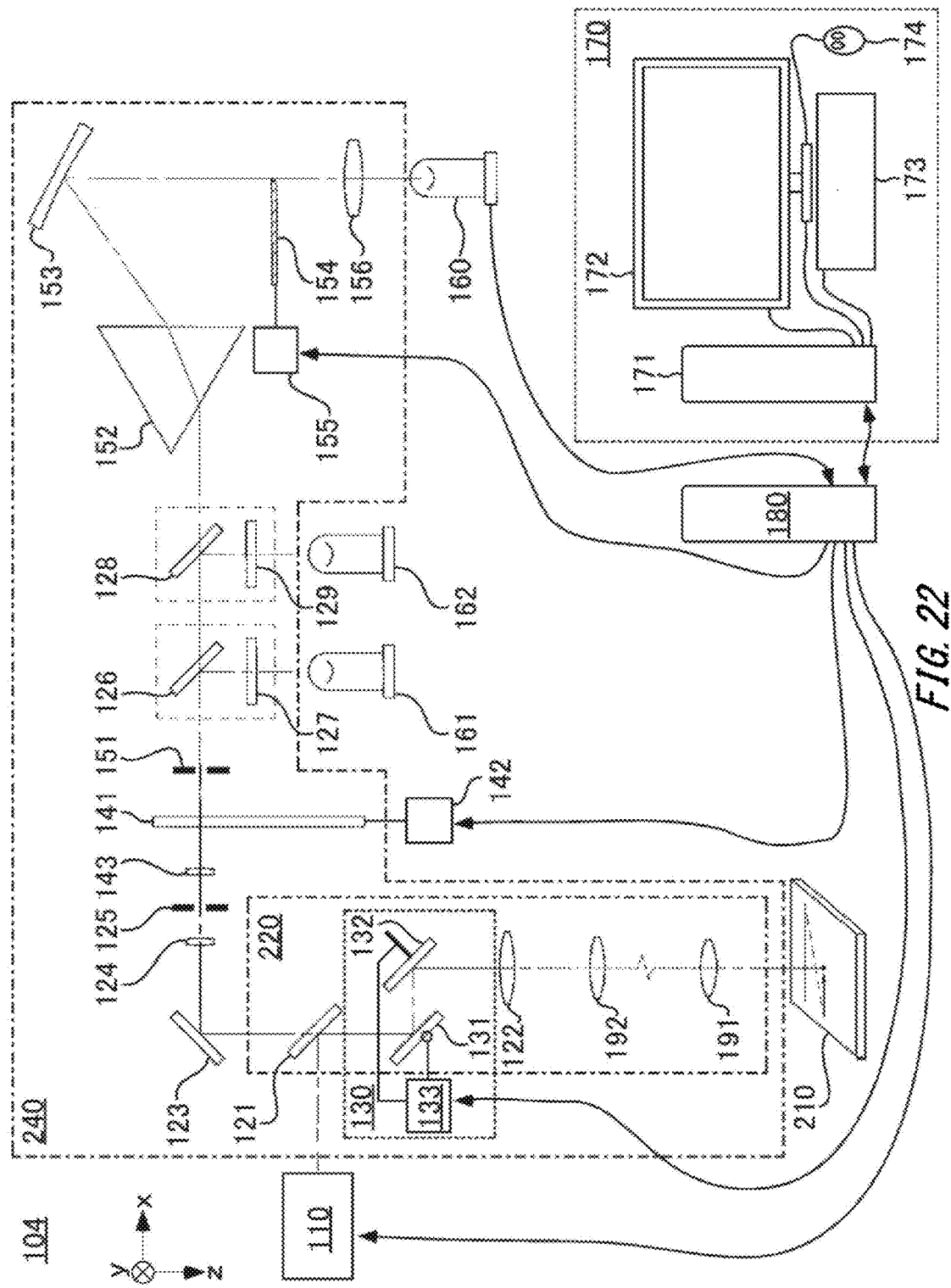
FIG. 22 schematically shows a microscope 104.

FIG. 22 schematically shows a microscope 104. The microscope 104 has the same structure as the microscope 101 shown in FIG. 1 except for the configurations described in the following. Accordingly, the elements the microscope 104 has in common with the microscope 101 are assigned with the identical reference numerals and not described again.

The microscope 104 has a different structure than the microscope 101 in that a plurality of dichroic mirrors 126 and 128 are inserted into the optical path of the emitted light between the LVF 141 and the light dispersing element 152 in the observation optical system 240.

While the emitted light propagates from the LVF 141 to the light dispersing element 152, the dichroic mirrors 126 and 128 are configured to reflect some of the components of the emitted light that are determined by their reflection and transmission characteristics, so that the reflected components diverge from the original optical path. The light beams reflected by the dichroic mirrors 126 and 128 are respectively received by detectors 161 and 162 via excitation light removal filters 127 and 129.

Figure 23:
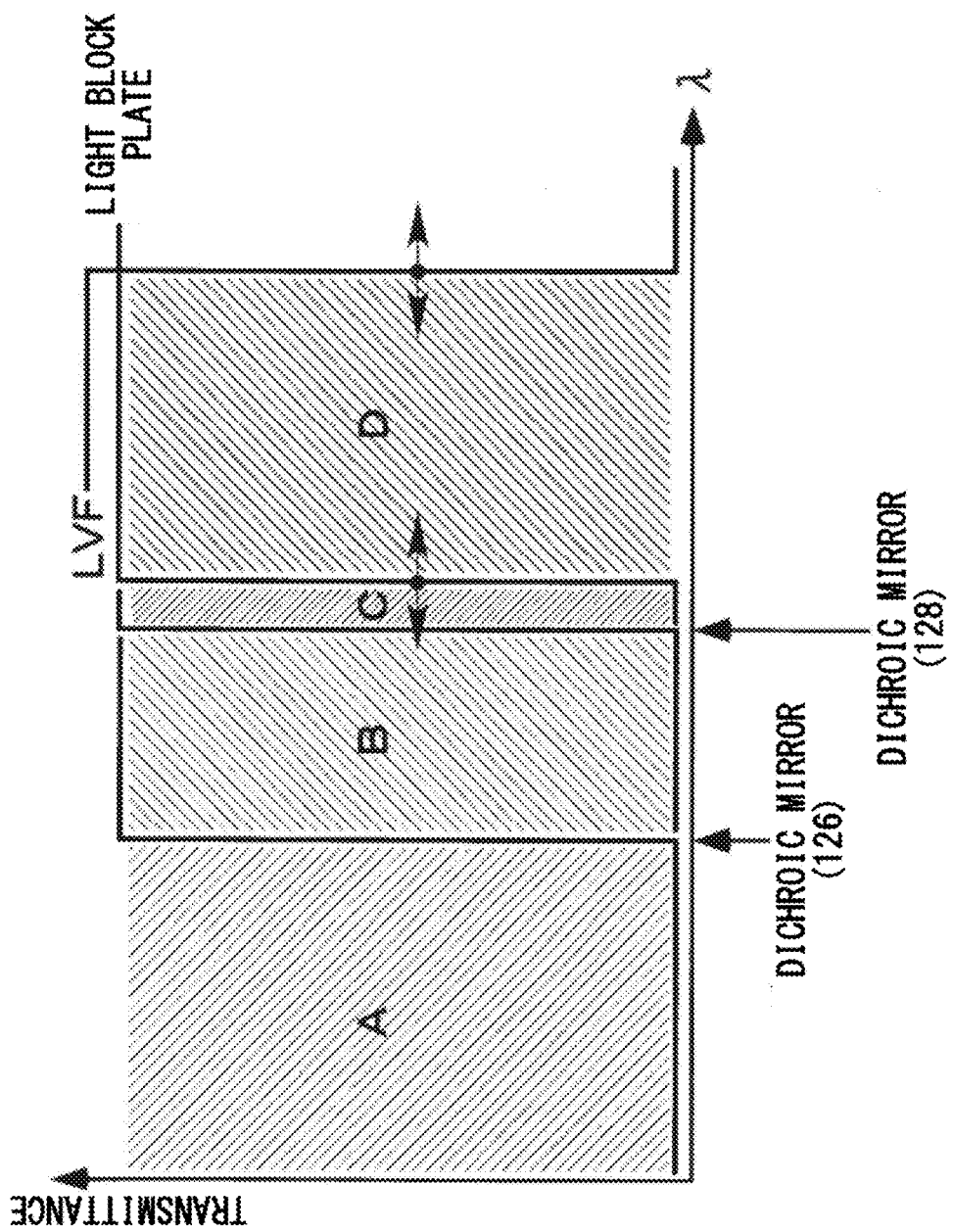
FIG. 23 is a graph showing an acquisition wavelength range of the microscope 104.

FIG. 23 is a graph showing the wavelengths to be detected by the detectors 160, 161 and 162 in the microscope 104. As shown in FIG. 23, while the emitted light propagates from the LVF 141 toward the light dispersing element 152, the LVF 141 blocks the wavelengths of the emitted light that are longer than its block wavelength and thus passes the wavelengths in the bands A to D.

The dichroic mirror 126 reflects the wavelengths in the band A that are shorter than a predetermined wavelength and transmits the wavelengths in the bands B to D longer than the predetermined wavelength. The excitation light removal filter 127 blocks the wavelength band of the excitation light that is in the short-wavelength portion in the band A, and transmits the wavelengths in the remaining band. The detector 161 detects the wavelengths of the band A that have passed through the excitation light removal filter 127.

The dichroic mirror 128 reflects the wavelengths that are shorter than a predetermined wavelength that is longer than the predetermined wavelength for the dichroic mirror 126 and transmits the wavelengths longer than the predetermined wavelength. Here, almost all of the wavelengths in the band A are reflected by the dichroic mirror 126 and do not enter the dichroic mirror 126. Therefore, the dichroic mirror 128 substantially reflects the wavelengths in the band B and transmits the wavelengths in the bands C and D. The excitation light removal filter 129 blocks the wavelength band of the excitation light and transmits the wavelengths in the remaining band. Therefore, the detector 162 detects the wavelengths of the band B that have passed through the excitation light removal filter 129.

The wavelengths in the bands C and D enter the light dispersing element 152, but the light block plate 154 transmits the wavelengths in the band D and blocks the wavelengths in the band C, as has been described with reference to FIG. 1. Accordingly, the detector 160 receives the wavelengths of the emitted light that are in the band D that is sandwiched between the block wavelength of the light block plate 154 and the block wavelength of the LVF 141. As described above, when provided in the microscope 104, the detectors 161 and 162 can detect some of the wavelengths that are otherwise blocked by the light block plate 154.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A microscope comprising:
an illumination optical system configured to illuminate a specimen with excitation light;
a detector configured to detect fluorescence emitted from the specimen; and
an observation optical system configured to guide the fluorescence to the detector, wherein
the observation optical system includes:
an optical filter having a wavelength characteristic that is variable based on a position at which the fluorescence is incident on the optical filter;
a light dispersing element configured to disperse, into light beams, light that has passed through the optical filter; and
a single light block plate, which is the only light block plate included in the observation optical system downstream of the light dispersing element, the light block plate (i) being configured to advance and retreat with respect to optical paths of the light beams resulting from the dispersion by the light dispersing element so as to block at least some of the light beams and (ii) advancing from and retreating to only one side of the optical paths of the light beams.

2. The microscope as set forth in claim 1, wherein a pinhole is provided between the optical filter and the light dispersing element.

3. The microscope as set forth in claim 1, wherein the optical filter is a linear variable filter.

4. The microscope as set forth in claim 1, wherein the light dispersing element is one of a prism and a diffraction grating.

5. The microscope as set forth in claim 1, wherein the observation optical system includes a convergence optical system configured to converge the light beams resulting from the dispersion onto the light block plate.

6. The microscope as set forth in claim 1, wherein the light block plate is tilted.

7. The microscope as set forth in claim 6, further comprising an absorbing portion configured to absorb light reflected by the light block plate.

8. The microscope as set forth in claim 1, further comprising:
a display unit; and
a controller unit configured to cause the display unit to display a setting screen used to set a detection wavelength range for the fluorescence and control positions of the optical filter and the light block plate based on the detection wavelength range for the fluorescence set via the setting screen.

9. The microscope as set forth in claim 1, wherein:
the optical filter transmits light having shorter wavelengths than a predetermined wavelength and blocks light having longer wavelengths than the predetermined wavelength, among the light beams produced by the light dispersing element; and
the single light block plate blocks light having shorter wavelengths than a predetermined wavelength, among the light beams produced by the light dispersing element.

10. A microscope comprising:
an illumination optical system configured to illuminate a specimen with excitation light;
a detector configured to detect fluorescence emitted from the specimen; and
an observation optical system configured to guide the fluorescence to the detector, wherein
the observation optical system includes:
an optical filter having a variable wavelength characteristic, the optical filter being configured to block a longer wavelength band of incoming light;
a light dispersing element configured to disperse, into light beams, light that has passed through the optical filter; and
a light block plate configured to block a shorter wavelength band of the light beams resulting from the dispersion by the light dispersing element.

11. A microscope comprising:
an illumination optical system configured to illuminate a specimen with excitation light;
a detector configured to detect fluorescence emitted from the specimen; and
an observation optical system configured to guide the fluorescence to the detector, wherein
the observation optical system includes:
an optical filter having a variable wavelength characteristic, the optical filter being configured to block a shorter wavelength band of incoming light;
a light dispersing element configured to disperse, into light beams, light that has passed through the optical filter; and
a light block plate configured to block a longer wavelength band of the light beams resulting from the dispersion by the light dispersing element.

* * * * *